(12) United States Patent
Futahashi et al.

(10) Patent No.: US 8,167,078 B2
(45) Date of Patent: May 1, 2012

(54) WORK VEHICLE

(75) Inventors: Kensuke Futahashi, Takasago (JP);
Yasutaka Fuke, Sagamihara (JP);
Hideki Hashimoto, Sagamihara (JP);
Masataka Kawaguchi, Takasago (JP);
Kiyomitsu Ogawa, Sagamihara (JP);
Hiroyuki Sugiura, Sagamihara (JP);
Hiroyuki Kanazawa, Takasago (JP);
Koichi Yamada, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 585 days.

(21) Appl. No.: 12/224,501

(22) PCT Filed: May 16, 2007

(86) PCT No.: PCT/JP2007/060063
§ 371 (c)(1),
(2), (4) Date: Aug. 28, 2008

(87) PCT Pub. No.: WO2007/138862
PCT Pub. Date: Dec. 6, 2007

(65) Prior Publication Data
US 2009/0025990 A1    Jan. 29, 2009

(30) Foreign Application Priority Data

May 30, 2006  (JP) .................. 2006-150378
Nov. 9, 2006  (JP) .................. 2006-303783

(51) Int. Cl.
*B60K 6/485*   (2007.10)
*B60K 17/00*   (2006.01)
(52) U.S. Cl. ................... 180/306; 180/65.26
(58) Field of Classification Search .............. 180/305, 180/306, 307, 65.21, 65.22, 65.225, 65.26
See application file for complete search history.

(56) References Cited

U.S. PATENT DOCUMENTS

| | | | | |
|---|---|---|---|---|
| 2,118,590 A | * | 5/1938 | Chilton | 475/266 |
| 3,401,764 A | * | 9/1968 | Schafer | 180/305 |
| 3,780,820 A | * | 12/1973 | Schwab et al. | 180/243 |
| 3,997,017 A | * | 12/1976 | Campbell et al. | 180/306 |
| 6,625,534 B2 | * | 9/2003 | Suzuki et al. | 701/62 |
| 6,660,222 B1 | | 12/2003 | Heinrich et al. | |
| 7,086,226 B2 | * | 8/2006 | Oguri | 60/414 |

(Continued)

FOREIGN PATENT DOCUMENTS

CA    2 530 949 A1    10/2005

(Continued)

*Primary Examiner* — John R Olszewski
(74) *Attorney, Agent, or Firm* — Birch, Stewart, Kolasch & Birch, LLP

(57) ABSTRACT

An object is to provide a work vehicle whose drive portion can be downsized. An engine having an engine output shaft, an electric motor driven by a battery which is attached integrally to the engine output shaft so as to drive the engine output shaft, a traveling drive portion having a transmission connected to the engine output shaft and a traveling drive shaft which is rotated by the transmission and which moves the traveling wheels, a work drive portion selectively performing work by means of power from the engine output shaft, a generator charging the battery, a traveling regeneration portion transmitting regenerative energy of the traveling drive portion to the generator, a work regeneration portion transmitting regenerative energy of a fork drive portion to the generator, and a one-way clutch for traveling and a one-way clutch for work provided, respectively, to the traveling regeneration portion and the work regeneration portion, which suppress transmission of motive power from the generator, are included.

3 Claims, 12 Drawing Sheets

U.S. PATENT DOCUMENTS

| | | |
|---|---|---|
| 7,464,778 B2 * | 12/2008 | Kato et al. ............... 180/65.245 |
| 2006/0196710 A2 * | 9/2006 | Banginski et al. ........... 180/65.2 |
| 2006/0243260 A1 | 11/2006 | Ichijo et al. |
| 2007/0205029 A1 * | 9/2007 | Leone et al. ................ 180/65.2 |
| 2007/0227801 A1 * | 10/2007 | Loeffler ....................... 180/305 |
| 2010/0044129 A1 * | 2/2010 | Kyle ......................... 180/65.25 |

FOREIGN PATENT DOCUMENTS

| | | |
|---|---|---|
| JP | 52-33810 A | 9/1950 |
| JP | 59-204402 A | 11/1984 |
| JP | 61-128134 U | 8/1986 |
| JP | 6-80042 A | 3/1994 |
| JP | 8-324262 A | 12/1996 |
| JP | 10-37904 A | 2/1998 |
| JP | 2000-226183 A | 8/2000 |
| JP | 2000-313600 A | 11/2000 |
| JP | 2001-16704 A | 1/2001 |
| JP | 2002-242234 A | 8/2002 |
| JP | 2003-250203 A | 9/2003 |
| JP | 2004-208493 A | 7/2004 |
| JP | 2005-133319 A | 5/2005 |
| JP | 2006-117341 A | 5/2006 |
| JP | 2006-273517 A | 10/2006 |
| WO | WO-2005/100230 A1 | 10/2005 |

* cited by examiner

WORK VEHICLE

BACKGROUND OF THE INVENTION

1. Field of the Invention

The present invention relates to a work vehicle equipped with an engine as a driving source, which performs work such as cargo handling and public works construction.

2. Description of the Related Art

In an engine forklift, because a single engine serves as the driving source for both the cargo handling system and the traveling system, an engine having a high engine output is used.

This raises problems, such as deterioration of energy efficiency and increase in exhaust gas when the engine is running at a low rotational frequency.

When an engine having a small output is used in order to eliminate these problems, it becomes necessary to disconnect the traveling system or the cargo handling system from the engine under high load conditions. Accordingly, there are restrictions on usage.

As a solution to such problems, as is disclosed, for example, in Patent Citation 1 and Patent Citation 2, there has been proposed a so-called a hybrid system in which an engine and a motor/generator are jointly used as the driving source.

The invention disclosed in Patent Citation 1 is configured in such a manner that the traveling system and the cargo handling system are driven separately by independent electric motors. The engine generates electric power by driving the generator and so charges the battery at the same time. Each of the electric motors for the traveling system and the cargo handling system is driven by electric power generated by the generator or electric power discharged from the battery.

The invention disclosed in Patent Citation 2 is configured in such a manner that the traveling system is driven by an electric motor and the cargo handling system is driven by the engine and a motor/generator. The electric motor is driven by electric power discharged from the battery. The battery is charged by excess electric power of the motor/generator driven by the engine and regenerative electric power from the electric motor.

In the inventions described in Patent Citation 1 and Patent Citation 2, the engine charges the battery under low load conditions, which eliminates the need to lower the rotational frequency. It is thus possible to improve fuel efficiency and lower the amount of exhaust gas.

Patent Citation 1: Japanese Unexamined Patent Application, Publication No. 2003-250203

Patent Citation 2: Japanese Unexamined Patent Application, Publication No. 2000-313600

Summary of the Invention

However, because the inventions described in Patent Citation 1 and Patent Citation 2 drive the traveling system using the electric motor alone, a large electric motor is required.

Also, because the maximum required driving output is supplied by the engine and the battery, the output of the engine has to be increased in order to compensate for the insufficient output of the battery that cannot be increased significantly. Accordingly, the engine becomes larger to some extent.

Further, the invention described in Patent Citation 1 has a large-size electric motor to drive the handling system.

As has been described, the inventions described in Patent Citation 1 and Patent Citation 2 have the problem that the drive portion to drive the traveling system and the cargo handling system is increased in size.

In view of the problems discussed above, an object of the invention is to provide a work vehicle capable of downsizing the drive portion that drives the traveling system and the cargo handling system.

In order to achieve the above and other objects, the invention adopts the following means.

That is, a first mode of the invention is a work vehicle having a traveling portion that performs traveling and a work portion that performs work using fluid pressure, including: an engine having an engine output shaft; an electric motor attached integrally to the engine output shaft and driven by a battery so as to drive the engine output shaft; a traveling drive portion having a transmission connected to the engine output shaft and a traveling drive shaft which is rotated by the transmission and which moves the traveling portion; a work drive portion selectively performing work by means of power from the engine output shaft; a generator charging the battery; a traveling regeneration portion transmitting regenerative energy of the traveling drive portion to the generator; a work regeneration portion transmitting regenerative energy of the work drive portion to the generator; and transmission suppression devices provided at both the traveling regeneration portion and the work regeneration portion, which suppress transmission of motive power from the generator.

According to this mode of the invention, because the electric motor driven by the battery is integrally attached to the engine output shaft so as to drive the engine output shaft, the engine output shaft is driven by the engine and/or the electric motor.

Because the engine output shaft is connected to the traveling drive portion and the work drive portion, the traveling drive portion that drives the traveling portion and the work drive portion that drives the work portion are driven by the engine and/or the electric motor.

As has been described, the traveling portion and the work portion are driven by the engine and/or the electric motor according the motive power required for each portion. It is therefore sufficient for the electric motor to have an output corresponding to the output of the battery and which together with the engine constitutes the maximum required driving output.

Hence, the driving force of the electric motor of this invention can be small in comparison with one that drives the traveling portion or the work portion independently. The structure can be thus downsized.

In addition, for example, the electric motor is used when the drive output is low, whereas the driving is performed by the engine when the driving force is increased, and the driving is performed by the engine and the electric motor when still more driving force is required. Hence, not only can the engine be used in a rotational frequency region where the fuel efficiency is high, but also the engine itself can be downsized.

In addition, the regenerative energy during deceleration in the traveling portion is transmitted to the generator from the traveling regeneration portion while the regenerative energy during deceleration in the work portion is transmitted to the generator from the work regeneration portion and converted to electricity by the generator, so that the battery can be charged.

In this instance, because the transmission suppression device suppresses the transmission of motive power from the generator, it is possible to prevent interference between the traveling portion and the work portion. For example, it is possible to prevent the regenerative energy of the traveling portion from driving the work portion via the generator.

As has been described, because the interference between the traveling portion and the work portion can be prevented, it is possible to collect the regenerative energy even when a single generator is used, which can in turn downsize the device.

In this case, it is preferable to configure the invention in such a manner that the regenerative energy will not flow into the transmission from the traveling drive shaft, for the sake of energy efficiency.

Also, in the first mode of the invention, it is preferable that the engine output shaft and the work drive portion are connected in a disconnectable manner.

When configured in this manner, in a case where the work portion is not driven, the drive force from the engine output shaft will not be transmitted to the work drive portion because the connection between the engine output shaft and the work drive portion has been interrupted. It is thus possible to prevent a loss of energy.

Also, in this mode of the invention, it is preferable that the work drive portion is provided with a switching valve which selects whether to supply fluid to the work portion or return fluid to a tank.

When configured in this manner, in a case where the work portion is not driven, the driving power from the engine output shaft will not be transmitted to the work portion if the switching valve is switched to return the fuel to the tank. It is thus possible to prevent a loss of energy.

Also, in the above mode of the invention, the connection portion between the traveling regeneration portion and the traveling drive shaft may comprise a speed-up gear that increases the speed on the side of the traveling regeneration portion.

In this case, the connection portion between the traveling regeneration portion and the traveling drive shaft comprises a speed-up gear that increases the speed on the traveling regeneration portion side. It is thus possible to rotate the generator by increasing the rotational frequency of the traveling drive shaft.

Consequently, the efficiency of power generation can be enhanced.

Also, in this mode of the invention, it may be configured in such a manner that the transmission suppression devices are one-way clutches.

In this case, because the transmission suppression devices are the one-way clutches, the regenerative energy from the traveling portion and the regenerative energy from the work portion are separately transmitted to the generator.

On the other hand, rotation of the generator rotated by the regenerative energy from either the traveling portion or the work portion is not transmitted to the other portion. It is thus possible to prevent the interference between the traveling portion and the work portion. For example, it is possible to prevent an event that the regenerative energy of the traveling portion drives the work portion via the generator.

In addition, in a case where the regenerative energy is inputted from the both, the generator is automatically rotated by whichever has the higher rotational frequency. Control to make this adjustment is therefore unnecessary.

Also, in the configuration described above, one of the transmission suppression devices may be a disengaging clutch.

In this case, because one of the transmission suppression devices is the disengaging clutch, in a case where the rotational frequency of the generator induced by the regenerative energy from either the traveling portion or the work portion is higher than that by the regenerative energy from the other portion, it is possible to prevent the regenerative energy from the slower portion from influencing the regenerative energy from the faster portion by disengaging the disengaging clutch.

In a case where the relation of the rotational frequencies is the opposite, the one-way clutch is capable of automatically preventing the influence to the other. It is thus possible to prevent the interference between the traveling portion and the work portion. For example, it is possible to prevent an event that the regenerative energy of the traveling portion drives the work portion via the generator.

In addition, in the configuration described above, a continuous variable transmission may be interposed between the disengaging clutch and the generator.

In this case, because the continuous variable transmission is interposed between the disengaging clutch and the generator, it is possible to match one rotational frequency with the other rotational frequency by adjusting the continuous variable transmission.

The capability of matching the one rotational frequency with the other rotational frequency allows the generator to be constantly driven by both the traveling portion and the work portion. It is thus possible to obtain the regenerative energy from the both, which can consequently enhance the fuel efficiency.

Also, a second mode of the invention is a work vehicle having a traveling portion that performs traveling and a work portion that performs a work using fluid pressure, including: an engine having an engine output shaft; a main motor/generator attached integrally to the engine output shaft so as to drive the engine output shaft and which is driven by a battery; a traveling drive portion having a transmission connected to the engine output shaft and a traveling drive shaft which is rotated by the transmission and which moves the traveling portion; a work drive portion having a work drive shaft connected to the engine output shaft in a disconnectable manner; and an auxiliary motor/generator connected to the battery with an electric output shaft thereof being connected to the work drive shaft via a one-way clutch so as to be driven.

According to this mode of the invention, because the electric motor driven by the battery is integrally attached to the engine output shaft so as to drive the engine output shaft, the engine output shaft is driven by the engine and/or the main motor/generator.

Because the engine output shaft is connected to the traveling drive portion and the work drive portion, the traveling drive portion that drives the traveling portion and the work drive portion that drives the work portion are driven by the engine and/or the main motor/generator.

In addition, because the auxiliary motor/generator is capable of driving the work drive shaft via the one-way clutch, the work drive portion is assisted also by the auxiliary motor/generator.

As has been described, the traveling portion and the work portion are driven by the engine and/or the main motor/generator according to the motive power required for each portion. It is therefore sufficient for the electric motor to have an output corresponding to the output of the battery and which together with the engine constitutes the maximum required driving output.

Hence, the driving force of the main motor/generator of this invention can be small in comparison with one that drives the traveling portion or the work portion independently. The structure can be thus downsized.

In addition, for example, the main motor/generator is used when driving output is low, whereas the driving is performed by the engine when the driving output is to be increased, and the driving is performed by the engine and the main motor/ generator when still more driving force is required. Hence, not only can the engine be run in a rotational frequency range where the fuel efficiency is high, but also the engine itself can be downsized.

In addition, the regenerative energy during deceleration in the traveling portion is transmitted to the main motor/generator from the traveling drive portion while the regenerative energy during deceleration in the work portion is transmitted to the auxiliary motor/generator from the work drive portion and converted to electricity, so that the battery can be charged.

In this case, because the regenerative energy of the traveling portion is consumed by the transmission, it is preferable to use a transmission having a low energy consumption rate, for the sake of energy efficiency.

As has been described, the regenerative energy of the traveling portion and the regenerative energy of the work portion are collected separately. It is thus possible to prevent interference between the portions with certainty. For example, it is possible to prevent the regenerative energy of the traveling portion from driving the work portion.

Also, a third mode of the invention is a work vehicle having a traveling portion that performs traveling and a work portion that performs work using fluid pressure, including: an engine having an engine output shaft in the middle of which a first one-way clutch is attached; a traveling drive portion having a transmission connected to the engine output shaft and a traveling drive shaft which is rotated by the transmission and which moves the traveling portion; a work drive portion having a drive shaft for work which is gear-coupled to an engine output shaft gear fixed downstream of the first one-way clutch in the engine output shaft; a switching valve provided in the work drive portion which selects whether to supply fluid to the work portion or return fluid to a tank; a first motor/generator connected to the drive shaft for work and driven by a battery; a work regeneration portion transmitting regenerative energy of the work drive portion to the engine output shaft gear via a second one-way clutch; and a second motor/generator gear-coupled to the traveling drive shaft and driven by the battery.

According to this mode of the invention, when the first motor/generator operates, the engine output shaft is driven via the work drive shaft and the engine output shaft gear. To this driving force is added the driving force of the engine, and the traveling drive shaft is driven via the transmission. Further, the traveling drive shaft is also driven by the second motor/generator.

Hence, the traveling portion is driven by the engine, the first motor/generator, and the second motor/generator.

Meanwhile, the work drive shaft is driven by the engine via the engine output shaft gear and it is also driven by the first motor/generator.

As has been described, the traveling portion and the work portion are driven by the engine and/or the first motor/generator (and the second motor/generator) according to the motive power required for each portion. It is therefore sufficient for each motor/generator to have an output which corresponds to the output of the battery and which together with the engine generates the maximum required driving output.

Hence, the driving force of each motor/generator in this invention can be small in comparison with one that drives the traveling portion or the work portion independently. The structure can be thus downsized.

In addition, for example, the motor/generator is used when driving output is low whereas the driving is performed by the engine when the driving force is increased, and the driving is performed by the engine and the motor/generator when still more driving force is required. Hence, not only can the engine be run in a rotational frequency range where the fuel efficiency is high, but also the engine itself can be downsized.

In addition, the regenerative energy during deceleration in the traveling portion is transmitted to the second motor/generator from the traveling drive shaft and converted to electricity by the second motor/generator, so that the battery can be charged.

In this case, it is preferable to configure the invention in such a manner that the regenerative energy will not flow into the transmission from the traveling drive shaft, for the sake of energy efficiency.

Also, the regenerative energy during deceleration in the work portion is transmitted to the first motor/generator via the second one-way clutch, the engine output shaft gear, and the work drive shaft, and converted to electricity by the first motor/generator, so that the battery can be charged.

In this way, the regenerative energy of the traveling portion and the regenerative energy of the work portion are collected separately. It is thus possible to prevent the interference between the portions with certainty. For example, it is possible to prevent the regenerative energy of the traveling portion from driving the work portion via the generator.

Further, a fourth mode of the invention is a work vehicle having a traveling portion that performs traveling and a work portion that performs work using fluid pressure, including: an engine having an engine output shaft in the middle of which is attached a first one-way clutch; a traveling drive portion having a transmission connected to the engine output shaft and a traveling drive shaft which is rotated by the transmission and which moves the traveling portion; a work drive portion having a work drive shaft connected to the engine output shaft extending on the side opposite to the first one-way clutch in a disconnectable manner; a first motor/generator which is gear-coupled to the work drive shaft via a second one-way clutch and which is driven by a battery; and a second motor/generator which is gear-coupled to the traveling drive shaft and which is driven by the battery.

According to this mode of the invention, the driving force of the engine is transmitted to the traveling drive shaft via the first one-way clutch and the transmission, and further, the driving force of the second motor/generator is transmitted to the traveling drive shaft.

Further, when the engine output shaft is connected to the work output shaft, the driving force of the first motor/generator is transmitted to the engine output shaft. Accordingly, the traveling portion is driven by the engine, the first motor/generator, and the second motor/generator.

Meanwhile, the work drive shaft is connected to the engine output shaft and driven by the engine and also by the first motor/generator.

In this way, the traveling portion and the work portion are driven by the engine and/or the first motor/generator (and the second motor/generator) according to the motive power required for each portion. It is therefore sufficient for each motor/generator to have an output which corresponds to the output of the battery and which together with the engine generates the maximum required driving output.

Hence, the driving force of each motor/generator in the invention can be small in comparison with ones that drive the traveling portion or the work portion independently. The structure can be thus downsized.

Also, for example, the electric motor is used when the driving output is low, whereas the driving is performed by the engine when the driving force is increased, and the driving is performed by the engine and the electric motor when still more driving force is required. Hence, not only can the engine be run in a rotational frequency range where the fuel efficiency is high, but also the engine itself can be downsized.

In addition, the regenerative energy during deceleration in the traveling portion is transmitted to the second motor/generator from the traveling drive shaft and converted to electricity by the second motor/generator, so that the battery can be charged.

In this case, it is preferable to configure the invention in such a manner that the regenerative energy will not flow into the transmission from the traveling drive shaft, for the sake of energy efficiency.

Also, the regenerative energy during deceleration in the work portion is transmitted to the first motor/generator via the work drive shaft and the second one-way clutch, and converted to electricity by the first motor/generator, so that the battery can be charged.

In this way, the regenerative energy of the traveling portion and the regenerative energy of the work portion are collected separately. It is thus possible to prevent interference between the portions with certainty. For example, it is possible to prevent the regenerative energy of the traveling portion from driving the work portion via the generator.

Also, for the third and the fourth modes of the invention described above, it is preferable that separate batteries are provided for the first motor/generator and the second motor/generator.

In this case, a separate battery is provided for the first motor/generator and to the second motor/generator. It is therefore possible to use a battery of the most appropriate capacity for each motor/generator.

Further, a fifth mode of the invention is a work vehicle having a traveling portion that performs traveling and a work portion that performs work using fluid pressure, including: an engine having an engine output shaft in the middle of which a first one-way clutch is attached; a traveling drive portion which is connected to the engine output shaft and which has a fluid transmission which transmits energy through a fluid medium and adjusts the state of the fluid, and a traveling drive shaft which is rotated by the fluid transmission and which drives the traveling portion; a work drive portion having a drive shaft for work which is gear-coupled to an engine output shaft gear which is fixed a downstream of the first one-way clutch of the engine output shaft; a switching valve provided in the work drive portion which selects whether to supply fluid to the work portion or return fluid to a tank; an auxiliary motor/generator which is connected to the drive shaft for work and which is driven by a battery; and a work regeneration portion transmitting regenerative energy of the work drive portion to the engine output shaft gear via a second one-way clutch.

According to this mode of the invention, when the auxiliary motor/generator operates, the engine output shaft is driven via the work drive shaft and the engine output shaft gear. To this driving force is added the driving force of the engine, and the traveling drive shaft is driven via the fluid transmission.

Hence, the traveling portion is driven by the engine and the auxiliary motor/generator.

Meanwhile, the work drive shaft is driven by the engine via the engine output shaft gear and also by the auxiliary motor/generator.

As has been described, the traveling portion and the work portion are driven by the engine and/or the auxiliary motor/generator according to the motive power required for each portion. It is therefore sufficient for the auxiliary motor/generator to have an output which corresponds to the output of the battery and which together with the engine generates the maximum required driving power.

Hence, the driving force of the auxiliary motor/generator of the invention can be small in comparison with one that drives the traveling portion or the work portion independently. The structure can be thus downsized.

Also, for example, the auxiliary motor/generator is used when the driving output is low, whereas the driving is performed by the engine when the driving force is increased, and the driving is performed by the engine and the auxiliary motor/generator when still more driving force is required. Hence, not only can the engine be run in a rotational frequency range where the fuel efficiency is high, but also the engine itself can be downsized.

Also, the regenerative energy during deceleration in the traveling portion is transmitted to the fluid transmission from the traveling drive shaft. In the fluid transmission, the state of the fluid is reversed and the engine output shaft is rotated in the opposite direction. The rotation of the engine output shaft is transmitted to the drive shaft for work which is gear-coupled to the engine output shaft gear, drive the auxiliary motor/generator, and are converted to electricity so that the battery can be charged.

Also, the regenerative energy during deceleration in the work portion is transmitted to the auxiliary motor/generator via the second one-way clutch, the engine output shaft gear, and the work drive shaft and converted to electricity by the first motor/generator, so that the battery can be charged.

In this instance, the reverse rotation of the engine output shaft will not be transmitted owing to the first one-way clutch.

As has been described, because the fluid transmission capable of transmitting energy inversely is used, the mechanism of the energy regeneration can be made simpler. Also, because the number of components can be lessened in comparison with a mechanical transmission, power loss can be reduced, which in turn enhances the efficiency.

Further, because the total weight can be reduced due to the structure being made simpler, it is possible to enhance the fuel efficiency.

Further, a sixth mode of the invention is a work vehicle having a traveling portion that performs traveling and a work portion that performs work using fluid pressure, including: an engine which has an engine output shaft in the middle of which a first one-way clutch is attached; a traveling drive portion which is connected to the engine output shaft and which has a fluid transmission which transmits energy through a fluid medium and which adjusts the state of the fluid, and a traveling drive shaft which is rotated by the fluid transmission and which drives the traveling portion; a work drive portion driving the work portion connected to a fluid channel of the fluid transmission via a switching valve for work; an auxiliary motor/generator which has a drive shaft gear-coupled to an engine output shaft gear which is fixed downstream of the first one-way clutch of the engine output shaft and which is driven by a battery; and a work regeneration portion transmitting regenerative energy of the work drive portion to the engine output shaft gear via a second one-way clutch.

According to this mode of the invention, when the auxiliary motor/generator operates, the engine output shaft is driven via the drive shaft and the engine output shaft gear. To this driving force is added the driving force of the engine, and the traveling drive shaft is driven via the fluid transmission.

Consequently, the traveling portion is driven by the engine and the auxiliary motor/generator.

Meanwhile, the work drive portion is connected to a channel of the fluid transmission by switching the switching valve for work and is operated. In other words, the work portion is driven by the same driving source as the traveling portion, that is, the engine and the auxiliary motor/generator.

Hence, the work drive portion is markedly simplified and its weight can be further reduced.

As has been described, the traveling portion and the work portion are driven by the engine and/or the auxiliary motor/generator according to the motive power required for each portion. It is therefore sufficient for the auxiliary motor/generator to have an output which corresponds to the output of the battery and which together with the engine generates the maximum required driving output.

Hence, the driving force of the auxiliary motor/generator of the invention can be small in comparison with one that drives the traveling portion or the work portion independently. The structure can be thus downsized.

Also, for example, the auxiliary motor/generator is used when the driving output is low, whereas the driving is performed by the engine when the driving force is increased and the driving is performed by the engine and the auxiliary motor/generator when still more driving force is required. Hence, not only can the engine be run in a rotational frequency range where the fuel efficiency is high, but also the engine itself can be downsized.

In addition, the regenerative energy during deceleration in the traveling portion is transmitted to the fluid transmission from the traveling drive shaft. In the fluid transmission, the state of the fluid is reversed and the engine output shaft is rotated in the opposite direction. The rotation of the engine output shaft is transmitted to the drive shaft for work which is gear-coupled to the engine output shaft gear, drive the auxiliary motor/generator, and are converted to electricity so that the battery can be charged.

Also, the regenerative energy during deceleration in the work portion is transmitted to the auxiliary motor/generator via the second one-way clutch, the engine output shaft gear, and the work drive shaft and is converted to electricity by the auxiliary motor/generator, so that the battery can be charged.

In this instance, the reverse rotation of the engine output shaft will not be transmitted to the engine owing to the first one-way clutch.

In this way, because the fluid transmission capable of transmitting the energy in reverse is used, the mechanism of the energy regeneration can be made simpler. Also, because the number of components can be made fewer than in a mechanical transmission, power loss can be reduced, which in turn enhances the efficiency.

Further, because the total weight can be reduced due to the structure being made simpler, the fuel efficiency can be enhanced.

Also, a seventh mode of the invention is a work vehicle having a traveling portion that performs traveling and a work portion that performs work using fluid pressure, including: an engine having an engine output shaft in the middle of which a first one-way clutch is attached; a traveling drive portion which is connected to the engine output shaft, has a fluid transmission which transmits energy through a medium of a fluid and adjusts the state of the fluid and through a traveling drive shaft which is rotated by the fluid transmission and which moves the traveling portion; a work drive portion driving the work portion connected to a fluid channel of the fluid transmission via a switching valve for work; an auxiliary motor/generator having a drive shaft gear-coupled to an engine output shaft gear fixed downstream of the first one-way clutch of the engine output shaft and driven by a battery; a work regeneration portion driving the traveling drive shaft by selectively supplying regenerative energy of the work drive portion to the fluid transmission; a traveling disengaging clutch attached to the traveling drive shaft at the middle; and a motor/generator for regeneration gear-coupled to the traveling drive shaft upstream of the traveling disengaging clutch.

According to this mode of the invention, when the auxiliary motor/generator operates, the engine output shaft is driven via the drive shaft and the engine output shaft gear. To this driving force is added the driving force of the engine, and the traveling drive shaft is driven via the fluid transmission.

Consequently, the traveling portion is driven by the engine and the auxiliary motor/generator.

Meanwhile, the work drive portion is operated by being connected to a channel of the fluid transmission when the switching valve for work is switched. In other words, the work portion is driven by the same driving source of the traveling portion, that is, the engine and the auxiliary motor/generator.

Hence, the work drive portion is markedly simplified and its weight can be further reduced.

As has been described, the traveling portion and the work portion are driven by the engine and/or the auxiliary motor/generator according to the motive power required for each portion. It is therefore sufficient for the auxiliary motor/generator to have an output which corresponds to the output of the battery and which together with the engine generates the maximum required driving output.

Hence, the driving force of the auxiliary motor/generator of this mode of the invention can be small in comparison with one that drives the traveling portion or the work portion independently. The structure can thus be downsized.

Also, for example, the auxiliary motor/generator is used when the driving output is low, whereas the driving is performed by the engine when the driving force is increased and the driving is performed by the engine and the auxiliary motor/generator when still more driving force is required. Hence, not only can the engine be run in a rotational frequency range where the fuel efficiency is high, but also the engine itself can be downsized.

Also, the regenerative energy during deceleration in the traveling portion is transmitted from the traveling drive shaft to the motor/generator for regeneration which is gear-coupled to the traveling drive shaft, drives the motor/generator for regeneration, and is converted to electricity.

In addition, the regenerative energy during deceleration in the work portion is supplied to the fluid transmission. In this instance, when normal transmission of energy from the fluid transmission is disabled, the traveling drive shaft is driven by the regenerative energy from the work portion. The rotation of the traveling drive shaft is transmitted to the motor/generator for regeneration which is gear-coupled to the traveling drive shaft, converted to electric energy, and collected.

As has been described, because the fluid transmission is utilized to collect the regenerative energy from the work portion, the structure of the work regeneration portion can be made simpler.

Also, an eighth mode of the invention is a work vehicle having a traveling portion that performs traveling and a work portion that performs work using fluid pressure, including: an engine having an engine output shaft; a traveling drive portion which is connected to the engine output shaft and has a fluid transmission which transmits energy through a fluid medium and which adjusts the state of the fluid and a traveling drive shaft which is rotated by the fluid transmission and moves the traveling portion; a work drive portion having a drive shaft for work which is gear-coupled to a traveling drive shaft gear fixed to the traveling drive shaft; a switching valve provided in the work drive portion which selects whether to supply fluid to the work portion or return fluid to a tank; an auxiliary motor/generator connected to the drive shaft for work and driven by a battery; and a work regeneration portion transmitting regenerative energy of the work drive portion to the traveling drive shaft gear via a work one-way clutch.

According to this mode, when the engine operates, the traveling drive shaft is driven via the fluid transmission. When the auxiliary motor/generator operates, the traveling drive shaft is driven via the work drive shaft and the traveling drive shaft gear. Consequently, the traveling portion is driven by the engine and the auxiliary motor/generator.

Meanwhile, the work drive shaft is driven by the engine via the traveling drive shaft gear and it is also driven by the auxiliary motor/generator.

As has been described, the traveling portion and the work portion are driven by the engine and/or the auxiliary motor/generator according to the motive power required for each portion. It is therefore sufficient for the auxiliary motor/generator to have an output which corresponds to the output of the battery and which together with the engine generates the maximum required driving output.

Hence, a driving force of the auxiliary motor/generator of the mode of the invention can be small in comparison with one that drives the traveling portion or the work portion independently. The structure can be thus downsized.

Also, for example, the auxiliary motor/generator is used when driving output is low, whereas the driving is performed by the engine when the driving force is increased and the driving is performed by the engine and the auxiliary motor/generator when still more driving force is required. Hence, not only can the engine be run in a rotational frequency range where the fuel efficiency is high, but also the engine itself can be downsized.

Also, the regenerative energy during deceleration in the traveling portion is transmitted from the traveling drive shaft to the drive shaft for work which is gear-coupled to the traveling drive shaft gear, drives the auxiliary motor/generator, and is converted to electricity, so that the battery can be charged.

In addition, the regenerative energy during deceleration in the work portion is transmitted to the auxiliary motor/generator via the work one-way clutch, the traveling drive shaft gear, and the work drive shaft, and converted to electricity by the auxiliary motor/generator, so that the battery can be charged.

In this instance, it is possible to prevent the reverse rotation of the traveling drive shaft from being transmitted to the engine by stopping energy conversion in the fluid transmission.

This eliminates the need to use a one-way clutch having high sensitivity to vibrations in order to prevent transmission of the regenerative energy to the engine. The safety of the entire device can be thus enhanced.

Also, because the number of components of the fluid transmission can be made fewer than in a mechanical transmission, power loss can be reduced, which in turn enhances the efficiency.

Further, because the total weight can be reduced due to the structure being made simpler, the fuel efficiency can be enhanced.

Also, in the fifth through the eighth mode of the invention, it is preferable that the fluid transmission is formed by combining a swash-plate type hydraulic pump and a hydraulic motor.

When configured in this manner, the fluid transmission can have a structure with high conversion efficiency. The efficiency during both the traveling and the work can be thus enhanced.

According to this mode of the invention, the traveling portion and the work portion are driven by the engine and/or the electric motor or the motor/generator according to the motive power required for each portion. It is therefore sufficient for the electric motor and the motor/generator to have an output which corresponds to the output of the battery and which together with the engine generates the maximum required driving output. The structure can be thus downsized.

In addition, because it is possible to obtain the regenerative energy from the driving portion and the work portion while driving the engine efficiently, the fuel efficiency can be enhanced and the engine itself can be downsized.

EXPLANATION OF REFERENCE

Figure 1:
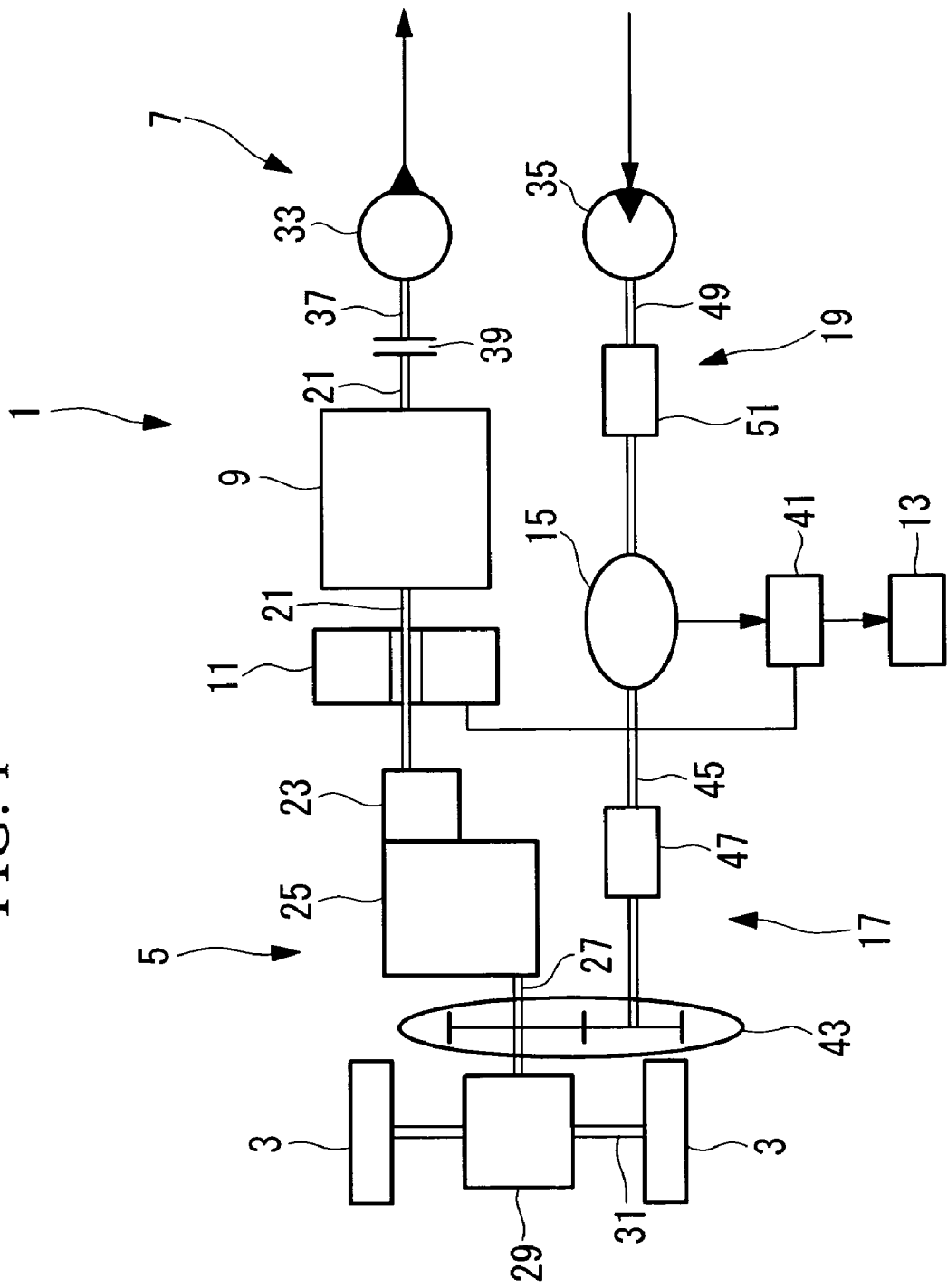
FIG. 1 is a block diagram showing a drive portion of a forklift according to a first mode of the invention.

1: forklift
3: traveling wheel
5: traveling wheel drive portion
7: fork drive portion
9: engine
11: electric motor
12: motor/generator
13: battery
15: generator
17: traveling regeneration portion
19: work regeneration portion
21: engine output shaft
23: torque converter
25: transmission
27: traveling drive shaft
37: work drive shaft
43: speed-up gear
47: one-way clutch for traveling
51: one-way clutch for work
53: switching valve
57: traveling regeneration clutch
59: continuous variable transmission
63: work auxiliary motor/generator 65: work auxiliary one-way clutch
67: work auxiliary shaft
77: accumulator
81: engine output shaft one-way clutch
83: engine output shaft gear
87: work assist motor/generator
91: battery
93: traveling assist motor/generator
97: hydraulic motor one-way clutch
101: battery
103: battery
107: rotation shaft one-way clutch
111: hydraulic transmission
123: assist motor/generator
125: drive-use three-way valve
129: regeneration-use three-way valve
137: motor/generator for regeneration

DETAILED DESCRIPTION OF THE INVENTION

Hereinafter, embodiments of the invention will be described with reference to the drawings.

Herein, embodiments in which the invention is applied to a forklift (work vehicle) will be described. It should be appreciated, however, that the work vehicle is not limited to a forklift, and the invention is applicable to a vehicle that travels and performs work such as cargo handling, specifically container transportation, or civil works construction, such as bulldozing and excavation by hydraulic means.

First Embodiment

A first embodiment of the invention will be described using FIG. 1.

FIG. 1 is a block diagram showing a drive portion of a forklift (work vehicle) 1.

The forklift 1 includes traveling wheels (traveling portions) 3 that perform traveling, a traveling wheel drive portion (traveling drive portion) 5 that rotationally drives the traveling wheels 3, a fork (work portion, not illustrated) that performs a cargo handling work, a fork drive portion (work drive portion) 7 that drives the fork, an engine 9, an electric motor (electric motor) 11, a battery 13, a generator 15, a traveling regeneration portion 17 that transmits regenerative energy of the traveling wheel drive portion 5, and a work regeneration portion 19 that transmits regenerative energy of the fork drive portion 7.

The engine 9 is, for example, an internal combustion engine, such as a diesel engine or a gasoline engine, and includes an engine output shaft 21 that transmits output of the engine 9.

The electric motor 11 has inside it a hollow output shaft. The electric motor 11 is disposed in such a manner that this output shaft surrounds the engine output shaft 21 and is attached to the engine output shaft 11 with a spline (or key) so as to rotate integrally.

The traveling wheel drive portion 5 includes a torque converter 23, a transmission 25, a traveling drive shaft 27, a differential gear 29, and a front axle 31.

The torque converter 23 is a transmission using a fluid, and it is furnished with a function of varying rotation speed from the engine output shaft 21 and amplifying a driving force (torque).

The transmission 25 is a mechanical transmission containing a forward-reverse clutch configured so as not to transmit a driving force when shifted to the neutral position.

The differential gear 29 transmits a driving force transmitted from the transmission 23 via the traveling drive shaft 27 further to the front axle 31, and it is furnished with a function of rotating the traveling wheels 3 on the right and the left smoothly at different speeds when the forklift 1 makes a turn.

The front axle 31 is equipped with a brake that stops the traveling wheels 3.

The fork drive portion 7 includes for example a fixed-capacity hydraulic pump motor 33 which supplies operating oil to a hydraulic actuator comprising a hydraulic cylinder or the like, a hydraulic motor 35 driven by the operating oil from the hydraulic actuator, and a work drive shaft 37 to drive the hydraulic pump 33, that drives the fork.

The work drive shaft 37 is connected to the engine output shaft 21 in a disconnectable manner by a clutch 39.

The generator 15 is furnished with a function of generating alternating-current electric power, and is connected to the battery 13 via an inverter 41. The inverter 41 is furnished with a DC-AC converting function and an alternating-current frequency converting function.

The alternating-current electric power generated by the generator 15 is converted to a direct-current by the inverter 41 and stored in the battery 13.

The electric motor 11 is connected to the battery 13 via the inverter 41. Direct-current electricity from the battery 13 is converted to alternating-current electricity at a frequency adjusted by the inverter 41 and supplied to the electric motor 11, upon which the electric motor 11 generates a rotational driving force.

The traveling regeneration portion 17 includes a speed-up gear 43, a traveling regeneration shaft 45, and a one-way clutch (transmission suppression device) 47 for traveling.

The speed-up gear 43 couples the traveling drive shaft 27 and the traveling regeneration shaft 45 and increases the rotational frequency of the traveling drive shaft 27 for transmission to the traveling regeneration shaft 45.

The traveling regeneration shaft 45 forms the input shaft of the generator 15.

The one-way clutch 47 for traveling is installed on the traveling rotation shaft 45 so as to transmit rotation of the speed-up gear 43 in one direction to the generator 15 side but not to transmit rotation in the other direction. In addition, it does not transmit rotation of the generator 15 in one direction to the speed-up gear 43 but does transmit rotation in the other direction.

The work regeneration portion 19 includes a work regeneration shaft 49 and a one-way clutch (transmission suppression device) 51 for work.

The work regeneration shaft 49 couples the hydraulic motor 35 and the generator 15, and serves as the input shaft of the generator 15.

The one-way clutch 51 for work is installed in the work rotation shaft 49 and transmits rotation of the hydraulic motor 35 in one direction to the generator 15 but does not transmit rotation in the other direction. Also, it does not transmit rotation of the generator 15 to the hydraulic motor in one direction but transmits rotation in the other direction.

An operation of the forklift 1 of this embodiment as described above will now be described.

For cargo handling work, the forklift 1 travels to a cargo while the fork is lowered and stops after it inserts the fork beneath the cargo.

Subsequently, it raises the fork (lift up) and lifts up the cargo.

It starts to travel in this state and transports the cargo to an intended place.

It stops upon arrival at the intended place. It then lowers the fork (lift down) and places the cargo down.

The forklift 1 is moved so as to pull out the fork from beneath the cargo and then is turned toward the next work.

During cargo handling work by the forklift 1, the traveling wheels 3 repeat the cycle of start, acceleration, traveling at a constant speed, deceleration, and stop, and the fork repeats a cycle of stop, lift up, and lift down.

The cargo handling work by the forklift 1 is performed as these operations are combined.

Hereinafter, an example of these operations will be described.

In a case where no work is performed while the traveling wheels 3 are traveling (start, acceleration, constant speed, deceleration, and stop), the clutch 39 is disengaged to disconnect the engine output shaft 21 and the work drive shaft 37.

When the engine 9 and/or the electric motor 11 are driven, the engine output shaft 21 is driven rotationally by these components.

The torque of the rotation of the engine output shaft 21 is amplified by the torque converter 23 and the speed of the rotation is changed by the transmission 25, after which it is transmitted to the traveling drive shaft 27.

The rotational driving force transmitted to the traveling drive shaft 27 is transmitted to the traveling wheels 3 by way of the differential gear 29 and the front axle 31. The driving wheels are thus rotated and forklift 1 travels due to this rotation.

As has been described, when the clutch 39 is disengaged, the drive force from the engine output shaft 21 is not transmitted to the fork drive portion 7. It is thus possible to prevent a loss of energy.

In a case where cargo lift up work is performed at the same time, the clutch 39 is engaged. Because the work drive shaft 37 is connected to the engine output shaft 21 by this engagement, the hydraulic pump 33 is driven by the engine 9 and/or the electric motor 11 so as to supply operating oil to the hydraulic actuator (not illustrated) for the lift up to be performed.

The engine 9 and/or the electric motor 11 share in supplying driving force according to the load created by the traveling and the cargo handling work.

As has been described, for the traveling and the cargo handling work, the driving is performed by the engine 9 and/or the electric motor 11 according to the motive power required for each work. It is therefore sufficient for the electric motor 11 to have an output which corresponds to the output of the battery 13 and which together with the engine 9 generates the maximum required driving output.

Hence, the driving force of the electric motor 11 of the embodiment can be small in comparison with one that drives the traveling wheels 3 or the hydraulic pump 33 independently. The structure can thus be downsized.

Also, for example, the electric motor 11 is used when driving output is low, whereas the driving is performed by the engine 9 when the driving force is increased and the driving is performed by the engine 9 and the electric motor 11 when still more driving force is required. Hence, not only can the engine 9 be run in a rotational frequency range where the fuel efficiency is high, but also the engine 9 itself can be downsized.

An energy regeneration operation of the traveling wheel drive portion 5 when the brake is applied on the traveling wheels 3 (when the brake is put on) will now be described.

The forward-reverse clutch of the transmission 25 is shifted to the neutral position, so that the engine output shaft 21 will not be driven by the traveling drive shaft 27. Also, the inverter 41 servo is turned on and operation of the generator 15 is enabled.

Motive power from the differential gear 29 is transmitted by way of the traveling drive shaft 27 and the rotational frequency is increased by the speed-up gear 43, after which it is transmitted to the traveling regeneration shaft 45.

The motive power transmitted to the traveling regeneration shaft 45 drives the generator 15 via the one-way clutch 47 for traveling.

The generator 15 generates alternating-current electricity by rotating. The alternating-current electricity thus generated is converted to direct-current electricity by the inverter 41 and charged into the battery 13.

The inverter 41 servo is off during the traveling, so that the generator 15 does not operate, and the consumption of motive power by the traveling regeneration portion 17 is minimized so that almost all the driving force is transmitted to the differential gear 29.

However, when the necessity arises, the embodiment may be configured in such a manner that the regenerative energy of the traveling wheel drive portion 5 is introduced to the engine output shaft 21, and electric power is generated by the electric motor 11 so as to charge the battery 13 by way of the inverter 41.

An energy regeneration operation of the fork drive portion 7 will now be described.

In a case where lift down is performed, the operating oil rotates the hydraulic motor 35. The work regeneration shaft 49 rotates due to rotation of the hydraulic motor 35 and drives the generator 15 via the one-way clutch 51 for work.

In this instance, the work regeneration shaft 49 is configured so as to move together with the traveling regeneration shaft 45 and rotate in the same direction.

The generator 15 generates alternating-current electricity by rotation. The alternating-current electricity thus generated is converted to direct-current electricity by the inverter 41 and charged into the battery 13.

The generator 15 is automatically driven by either the traveling regeneration shaft 45 or the work regeneration shaft 49, whichever has the higher rotational frequency. Hence, the need for a control mechanism to make this adjustment can be eliminated.

In a case where the rotational frequency of the speed-up gear 43 is lower than the rotational frequency of the hydraulic motor 35, that is, in a case where the differential gear 29 is stopped or rotating at a low speed, the generator 15 is driven by the work regeneration shaft 49.

In this instance, rotation of the generator 15 is transmitted to the traveling regeneration shaft 45. However, transmission to the speed-up gear 43 is prevented by the one-way clutch 47 for traveling.

Hence, because rotation of the generator 15 is not transmitted to the traveling wheel drive portion 5, it is possible to prevent interference with the traveling underway at that time.

On the contrary, in a case where the rotational frequency of the speed-up gear 43 is higher than the rotational frequency of the hydraulic motor 35, in other words, in a case where the differential gear 29 is rotating at a high speed, the generator 15 is driven by the traveling regeneration shaft 45.

In this instance, the rotation of the generator 15 is transmitted to the work regeneration shaft 49. However, transmission to the hydraulic motor 35 is prevented by the one-way clutch 51 for work.

Hence, because rotation of the generator 15 is not transmitted to the work regeneration portion 19, it is possible to prevent interference with a cargo handling operation.

As has been described, because it is possible to prevent the interference between the traveling wheel drive portion 5 and the fork drive portion 7, it is possible to collect regenerative energy even when the single generator 15 is used, and the device can be made that much more compact.

Second Embodiment

A second embodiment of the invention will now be described using FIG. 2.

In this embodiment, the basic configuration is the same as in the first embodiment, and the configurations of the fork drive portion 7 and the traveling regeneration portion 17 are different. Accordingly, these differences in this embodiment will be described and the description of the other portions will not be repeated.

The same components as in the first embodiment are labeled with the same numbers, and a detailed description of such components is omitted here.

Figure 2:
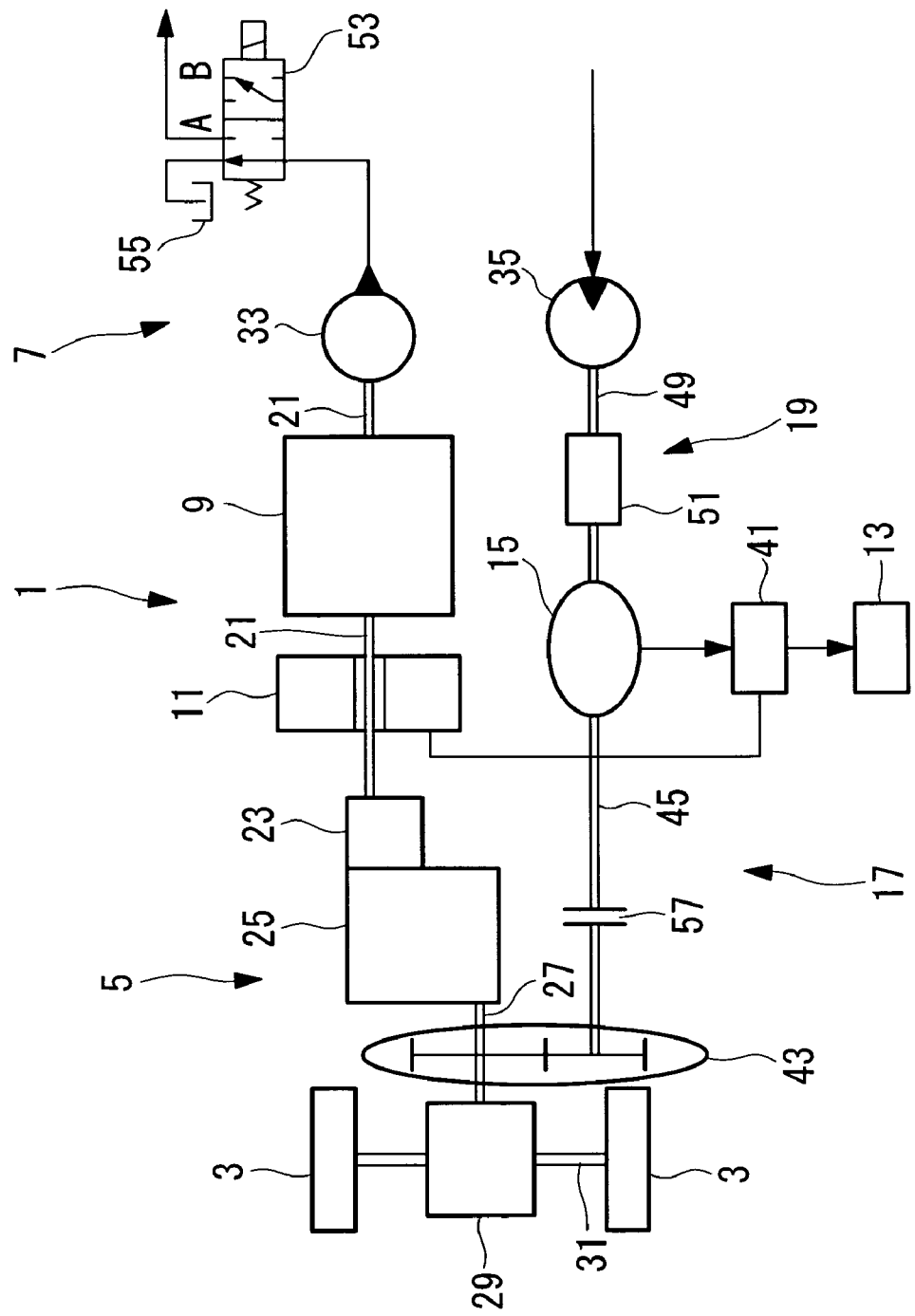
FIG. 2 is a block diagram showing a drive portion of a forklift according to a second embodiment of the invention.

FIG. 2 is a block diagram showing a drive portion of the forklift 1.

In this embodiment, the hydraulic pump 33 is directly connected to the engine output shaft 21 and configured to be operated constantly by the engine drive shaft 21.

An operating oil feeding channel of the hydraulic pump 33 is provided with a switching valve 53. The switching valve 53 is configured to switch between a port A connected to an operating oil tank 55 and a port B connected to the hydraulic actuator.

The traveling regeneration portion 17 is provided with a traveling regeneration clutch (disengaging clutch) 57 instead of the one-way clutch 47 for traveling which is provided in the first embodiment.

An operation of the forklift 1 of this embodiment configured as above will now be described.

Because the basic operation is the same as in the first embodiment, the description is not repeated, and operations of the fork drive portion 7 and the traveling regeneration portion 17 will be described.

In a case where the engine 9 and/or the electric motor 11 are driven and the engine output shaft 21 is therefore rotating, the hydraulic pump 33 is constantly driven by the engine output shaft 21 and supplies the operating oil.

In a case where cargo handling work is not performed, the switch valve 53 is switched to the port A. When switched in this manner, the operating oil supplied from the hydraulic pump 33 is returned to the operating oil tank 55.

Accordingly, hardly any load is applied to the hydraulic pump 33. It is thus possible to minimize an energy loss of the engine output shaft 21.

On the other hand, in a case where a cargo handling work is performed, the switching valve 53 is switched to the port B to supply the operating oil to the hydraulic actuator.

In a case where energy of the traveling wheel drive portion 5 is regenerated, the traveling regeneration clutch 57 is engaged, and the generator 15 is driven by the traveling drive shaft 27 via the speed-up gear 43 and the traveling regeneration shaft 45.

In a case where energy is not regenerated, the traveling regeneration clutch 57 is disengaged. When disengaged in this manner, no driving force is supplied to the generator 15 from the traveling regeneration portion 17 during the traveling so that there is corresponding reduction in loss of traveling driving force, but also makes it possible to prevent interference with the hydraulic motor 35 in a reliable manner.

The traveling regeneration clutch 57 measures the rotational frequency of the speed-up gear 43 and the rotational frequency of the hydraulic motor 35 while the traveling regeneration portion 17 and the work regeneration portion 19 are operating. In a case where the rotational frequency of the speed-up gear 43 is found to be higher, the traveling regeneration clutch 57 is engaged and the generator 15 is driven by the traveling regeneration shaft 45.

In a case where the rotational frequency of the speed-up gear 43 is found to be lower, the embodiment is controlled in such a manner that the traveling regeneration clutch 57 is disengaged so that the generator 15 is not driven by the traveling regeneration shaft 45 and the generator 15 is driven by the work regeneration shaft 49 instead.

As has been described, in this embodiment, it is possible to prevent interference between the traveling wheel drive portion 5 and the fork drive portion 7 by disengaging the traveling regeneration clutch 57. It is thus possible to collect the regenerative energy even when a single generator 15 is used, and the device can be made that much more compact.

In this embodiment, the traveling regeneration clutch 57 is provided at the traveling regeneration portion 17 and the one-way clutch 51 for work is provided at the work regeneration portion 19. However, this embodiment may be configured conversely, the disengaging clutch provided at the work regeneration portion 19 and the one-way clutch provided at the traveling regeneration portion 17.

Also, the embodiment may be configured in such a manner that when the necessity arises, the regenerative energy of the traveling wheel drive portion 5 is introduced to the engine output shaft 21, and electric power is generated by the electric motor 11, which charges the battery 13 by way of the inverter 41.

Third Embodiment

A third embodiment of the invention will now be described using FIG. 3.

In this embodiment, the basic configuration is the same as in the first embodiment, and the configuration of the traveling regeneration portion 17 is different. Accordingly, these differences in this embodiment will be described and the description of the other portions will not be repeated.

The same components as in the first embodiment are labeled with the same numbers, and a detailed description of such components is omitted here.

Figure 3:
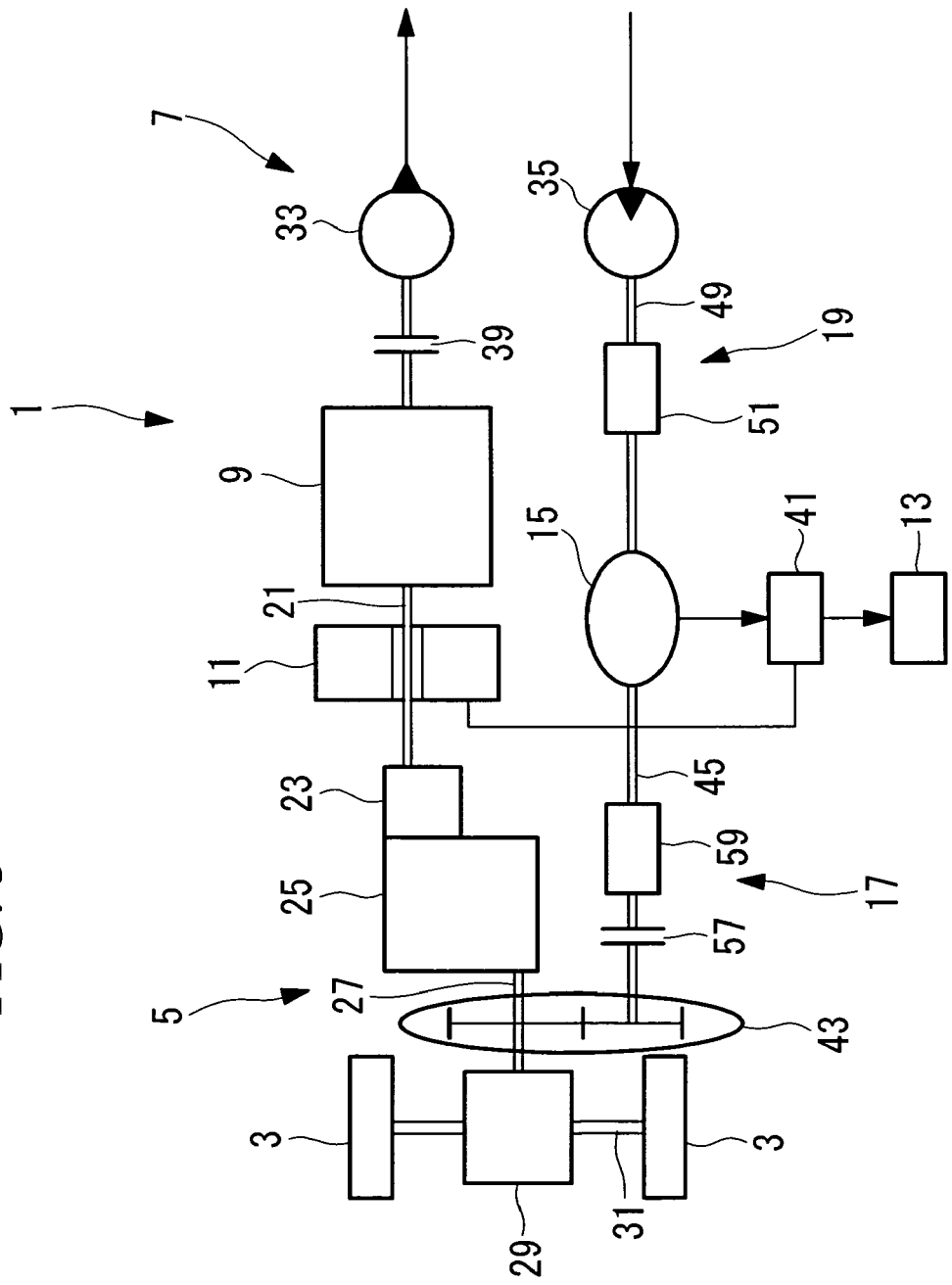
FIG. 3 is a block diagram showing a drive portion of a forklift according to a third embodiment of the invention.

FIG. 3 is a block diagram showing a drive portion of the forklift 1.

The traveling regeneration portion 17 of this embodiment is provided with the traveling regeneration clutch 57 and a continuous variable transmission 59 instead of the one-way clutch 47 for traveling of the first embodiment.

In the forklift 1 of this embodiment configured as above, the function and the effect of the traveling regeneration clutch 57 are the same as those in the second embodiment and the description is not repeated herein.

In a case where energy is regenerated from both the traveling wheel drive portion 5 and the fork drive portion 7, it is possible to make the rotational frequency of the traveling regeneration shaft 45 the same as the rotational frequency of the work regeneration shaft 49 by controlling the continuous variable transmission 59.

The ability to make the rotational frequency of the traveling regeneration shaft 45 the same as the rotational frequency of the work regeneration shaft 49 allows the generator 15 to be driven constantly by both the traveling regeneration shaft 45 and the work regeneration shaft 49. It is therefore possible to obtain regenerative energy from both and the fuel efficiency can be consequently enhanced.

In a case where the energy is regenerated from the traveling wheel drive portion 5, for example, it is possible to increase the rotational frequency of the traveling regeneration shaft 45 by the continuous variable transmission 59. The regenerative efficiency can be therefore enhanced.

In this embodiment, the traveling regeneration clutch 57 and the continuous variable transmission 59 are provided at the traveling regeneration portion 17 and the one-way clutch 51 for work is provided at the work regeneration portion 19. However, the embodiment may be configured conversely, the disengaging clutch and a continuous variable transmission being provided at the work regeneration portion 19 and the one-way clutch being provided at the traveling regeneration portion 17.

Also, the embodiment may be configured in such a manner that when the necessity arises, the regenerative energy of the traveling wheel drive portion 5 is introduced to the engine output shaft 21 and electric power is generated by the electric motor 11 which charges the battery 13 by way of the inverter 41.

Fourth Embodiment

A fourth embodiment of the invention will now be described using FIG. 4.

In this embodiment, the basic configuration is the same as in the first embodiment, and the configuration of the traveling wheel drive portion 5, the configuration of the fork drive portion 7, and the configuration of the regeneration portion are different. Accordingly, these differences in this embodiment will be described and the description of the other portions will not be repeated.

The same components as in the first embodiment are labeled with the same numbers, and a detailed description of such components is omitted here.

Figure 4:
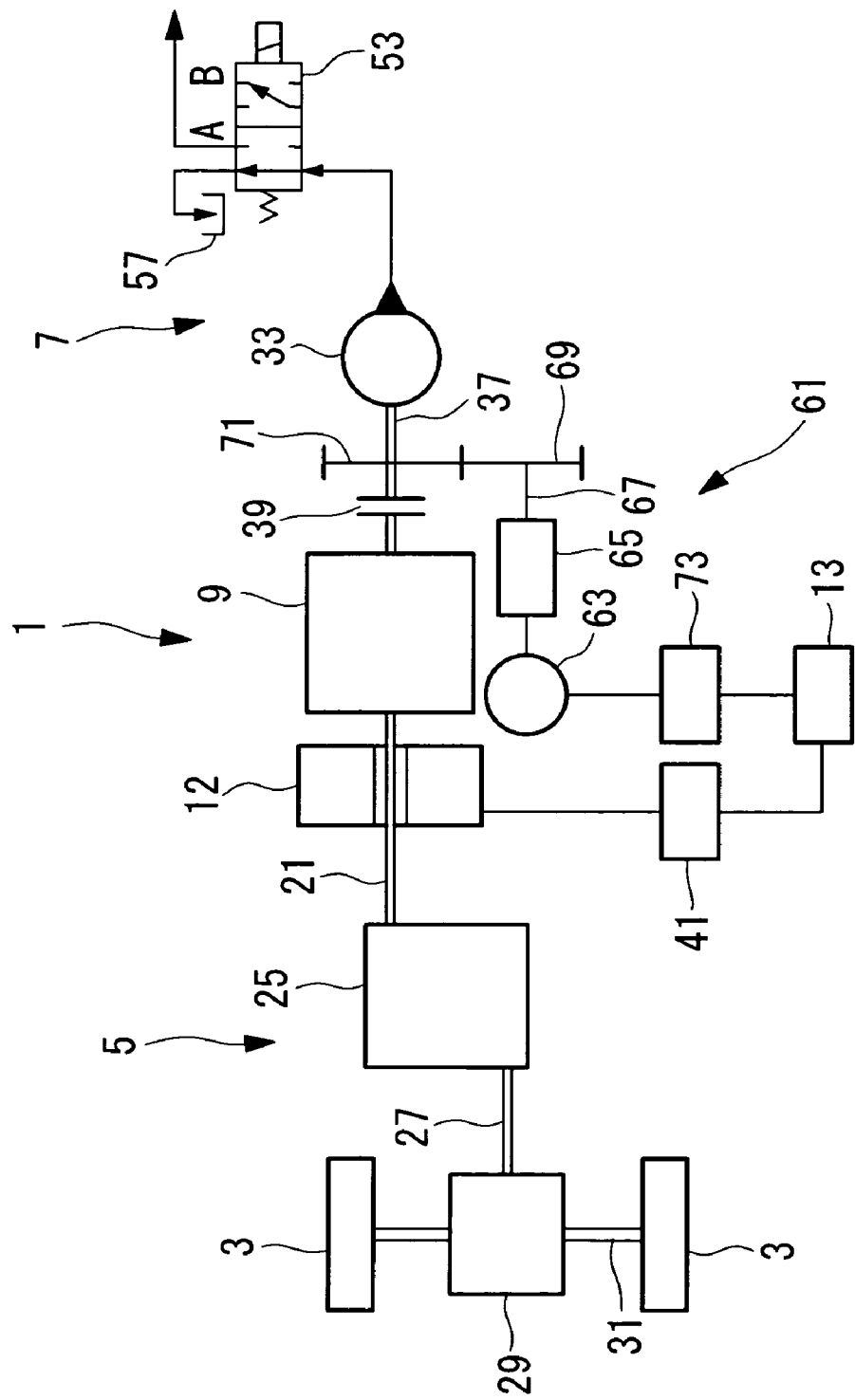
FIG. 4 is a block diagram showing a drive portion of a forklift according to a fourth embodiment of the invention.

FIG. 4 is a block diagram showing a drive portion of the forklift 1.

The torque converter 23 is not used in the traveling wheel drive portion 5. Hence, because the torque multiplying function of the torque converter 23 is absent, it is preferable to use a motor/generator (main motor/generator) 12 type with a higher torque than the electric motor 11 in the first embodiment.

On the other hand, because the torque converter 23 that causes a large energy loss is not used, it is possible to efficiently regenerate energy of the rotation transferred from the differential gear 29 to the engine output shaft 21, that is, to the motor/generator 12, via the transmission 25.

Hence, the motor/generator 12 is directly used for regeneration of the energy of the traveling wheel drive portion 5 and the traveling regeneration portion 17 of the first embodiment is omitted.

The fork drive portion 7 includes the hydraulic pump motor 33, the work drive shaft 37 to drive the hydraulic pump 33, the clutch 39, the switching valve 53, and a work auxiliary drive portion 61.

The hydraulic pump 33 is configured so as to receive the operating oil from the port B of the switching valve 53 when the fork is lowered so as to rotate in a direction opposite to the direction when it supplies the operating oil.

The work auxiliary drive portion 61 includes a work auxiliary motor/generator (auxiliary motor/generator) 63, a work auxiliary one-way clutch (one-way clutch) 65, a work auxiliary shaft (electric motor output shaft) 67, a work auxiliary gear 69, and a work drive shaft gear 71.

The work drive shaft gear 71 is attached to the work drive shaft 37 between the hydraulic pump 33 and the clutch 39. The work auxiliary shaft 67 is the output shaft of the work auxiliary motor/generator 63, and the work auxiliary gear 69 which is meshed with the work drive shaft gear 71 is attached to the end portion of work auxiliary shaft 67.

The work auxiliary one-way clutch 65 is furnished with a function of transmitting the drive force of the work auxiliary motor/generator 63 to the work auxiliary gear 69 to rotate the work auxiliary gear 69 in a direction in which the hydraulic pump 33 is driving, and on the other hand transmitting the drive force of the work auxiliary gear 69 to the work auxiliary motor/generator 63 in a case where the work auxiliary gear 69 rotates in a direction opposite to the direction specified above, that is, in a case where the hydraulic pump 33 rotates in the opposite direction.

The work auxiliary motor/generator 63 is connected to the battery 13 via an inverter 73.

An operation of the forklift 1 of this embodiment described above will now be described.

In a case where cargo handling work is not performed while the traveling wheels 3 are traveling (start, acceleration, constant speed, deceleration, and stop), the clutch 39 is disengaged to disconnect the engine output shaft 21 and the work drive shaft 37.

When the engine 9 and/or the motor/generator 12 are driven, the engine output shaft 21 is driven rotationally by these components.

The rotational driving of the engine output shaft 21 is changed by the transmission 25 and transmitted to the traveling drive shaft 27.

The rotational driving force transmitted to the traveling drive shaft 27 is transmitted to the traveling wheels 3 by way of the differential gear 29 and the front axle 31. The driving wheels are thus rotated and forklift 1 travels owing to this rotation.

As has been described, the drive force from the engine output shaft 21 is not transmitted to the fork drive portion 7 when the clutch 39 is disengaged. It is thus possible to prevent a loss of energy.

In a case where lift-up cargo handling work requiring low motive power is performed at the same time, the work auxiliary motor/generator 63 is driven, and this drives the work drive shaft 37 via the work auxiliary shaft 67, the work auxiliary gear 69, and the work drive shaft gear 71. Consequently, the hydraulic pump 33 is driven, and if the switching valve 53 is switched to the B port, the operating oil is supplied to the (not illustrated) hydraulic actuator and the lift up is performed.

In a case where high motive power is required for the lift up, the clutch 39 is engaged. Because the work drive shaft 37 is connected to the engine output shaft 21 by this engagement, the hydraulic pump 33 is driven by the engine 9 and/or the motor/generator 12 as well as the work auxiliary motor/generator 63. The operating oil is thus supplied to the (not illustrated) hydraulic actuator for the lift up to be performed.

In this case, if the switching valve 53 is switched to the A port, the operating oil from the hydraulic pump 33 is returned to an operating oil tank 57, so that the load of the hydraulic pump 33 is lessened. It is therefore possible to supply the maximum driving force to the traveling wheel drive portion 5.

The engine 9 and/or the motor/generator 12 as well as the work auxiliary motor/generator 63 share in providing the driving force according to the load imposed by the traveling and the cargo handling work.

As has been described, for the traveling and the cargo handling work, the engine 9 and/or the motor/generator 12 as well as the work auxiliary motor/generator 63 are driven according to the motive power required for each work. It is therefore sufficient for the motor/generator 12 and the work auxiliary motor/generator 63 to have an output which corresponds to the output of the battery 13 and which together with the engine 9 generates the maximum required driving output.

Hence, the driving force of the motor/generator 12 of this embodiment can be small in comparison with one that drives the traveling wheels 3 or the hydraulic pump 33 independently. The structure can be thus downsized.

Also, for example, the motor/generator 12 is used when the driving output is low, whereas the driving is performed by the engine 9 when the driving force is increased and the driving is performed by the engine 9 and the motor/generator 12 when still more driving force is required. Hence, not only can the engine 9 be run in a rotational frequency range where the fuel efficiency is high, but also the engine 9 itself can be downsized.

An energy regeneration operation of the traveling wheel drive portion 5 when the brake is applied on the traveling wheels 3 (when the break is put on) will now be described.

Motive power from the differential gear 29 is transmitted to the transmission 25 from the traveling drive shaft 27 to rotate the engine output shaft 21. The output shaft engaged with the engine output shaft 21 rotates, and so the motor/generator 12 generates electric power and charges the battery 13 via the inverter 41.

An energy regeneration operation of the fork drive portion 7 in the case where the switching valve 53 is switched to the B port while the clutch 39 is disengaged will now be described.

In the case where lift-down is performed in this state, the operating oil flows backward to the hydraulic pump 33 and rotationally drives the hydraulic pump 33 in the opposite direction. This reverse rotation is transmitted by way of the work drive shaft 37, the work drive shaft gear 71, and the work auxiliary shaft gear 69, and drives the work auxiliary motor/generator 63 via the work auxiliary one-way clutch 65.

The work auxiliary motor/generator 63 generates alternating-current electricity as it rotates. The alternating-current electricity thus generated is converted to direct-current electricity by the inverter 73 and charged into the battery 13.

Because the regenerative energy of the traveling wheel drive portion 5 and the regenerative energy of the fork drive portion 7 are collected separately in this manner, it is possible to prevent the interference of the portions with each other in a reliable manner.

In this embodiment, the work auxiliary motor/generator 63 is used for the conversion to electricity in the regeneration of the energy of the fork drive portion 7. However, as is shown in FIG. 5, the energy may be regenerated by changing the state of the operating oil.

Figure 5:
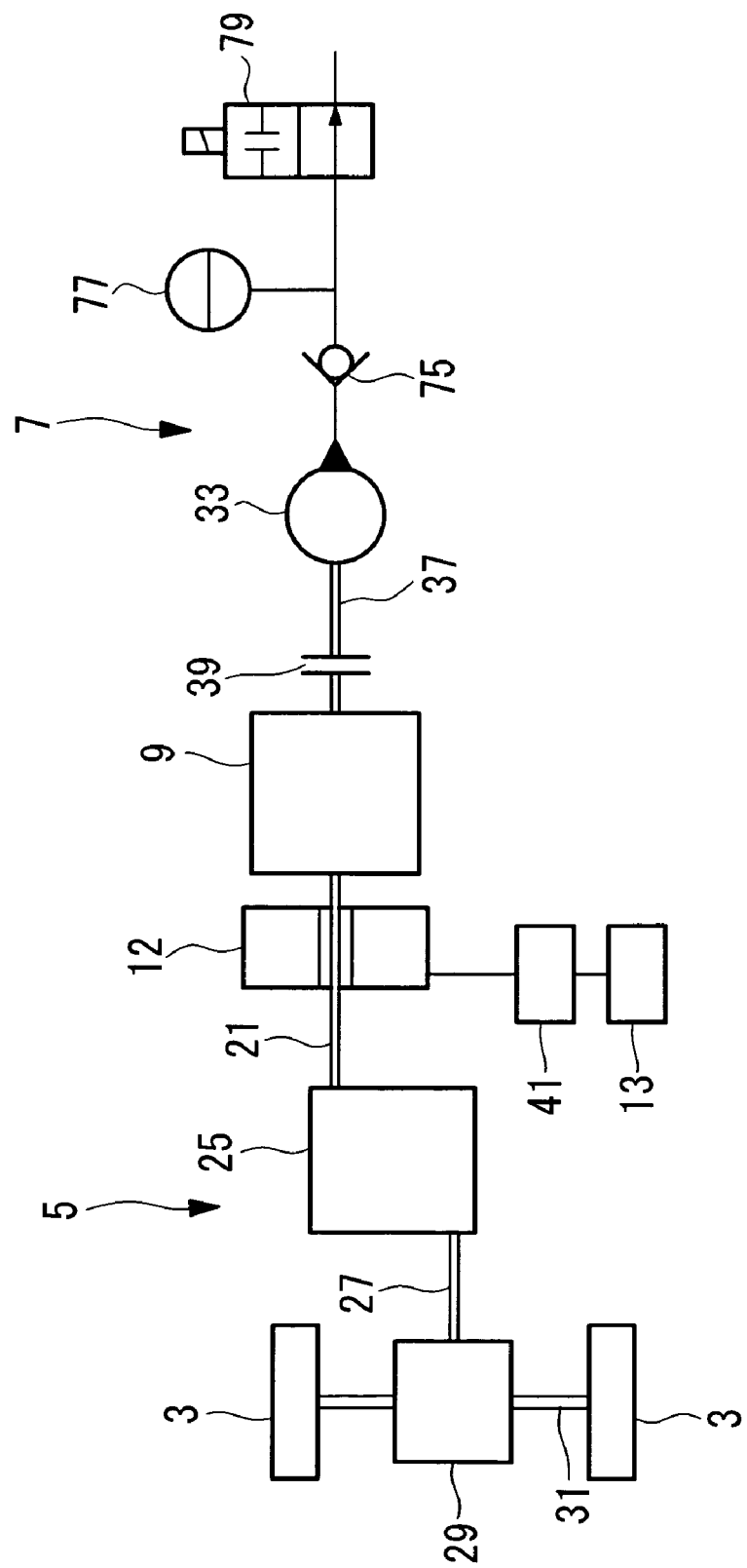
FIG. 5 is a block diagram showing another example of the drive portion of the forklift according to the fourth embodiment of the invention.

FIG. 5 shows the configuration in which a check valve 75, an accumulator 77, and an on-off valve 79 are provided at the operating oil feeding channel from the hydraulic pump 33, so that the operating oil returned to the hydraulic pump 33 by the lift-down operation is introduced into the accumulator 77 and so kept in pressurized form.

When the energy is regenerated in the form of oil pressure in this manner, the energy efficiency is high because there is no conversion loss resulting from the conversion to electricity.

Fifth Embodiment

A fifth embodiment of the invention will now be described using FIG. 6 and FIG. 7.

Because this embodiment is of a configuration similar to that of the first embodiment, the differences in this embodiment will be described and the description of the other portions will not be repeated.

The same components as in the first embodiment are labeled with the same numbers, and a detailed description of such components is omitted here.

Figure 6:
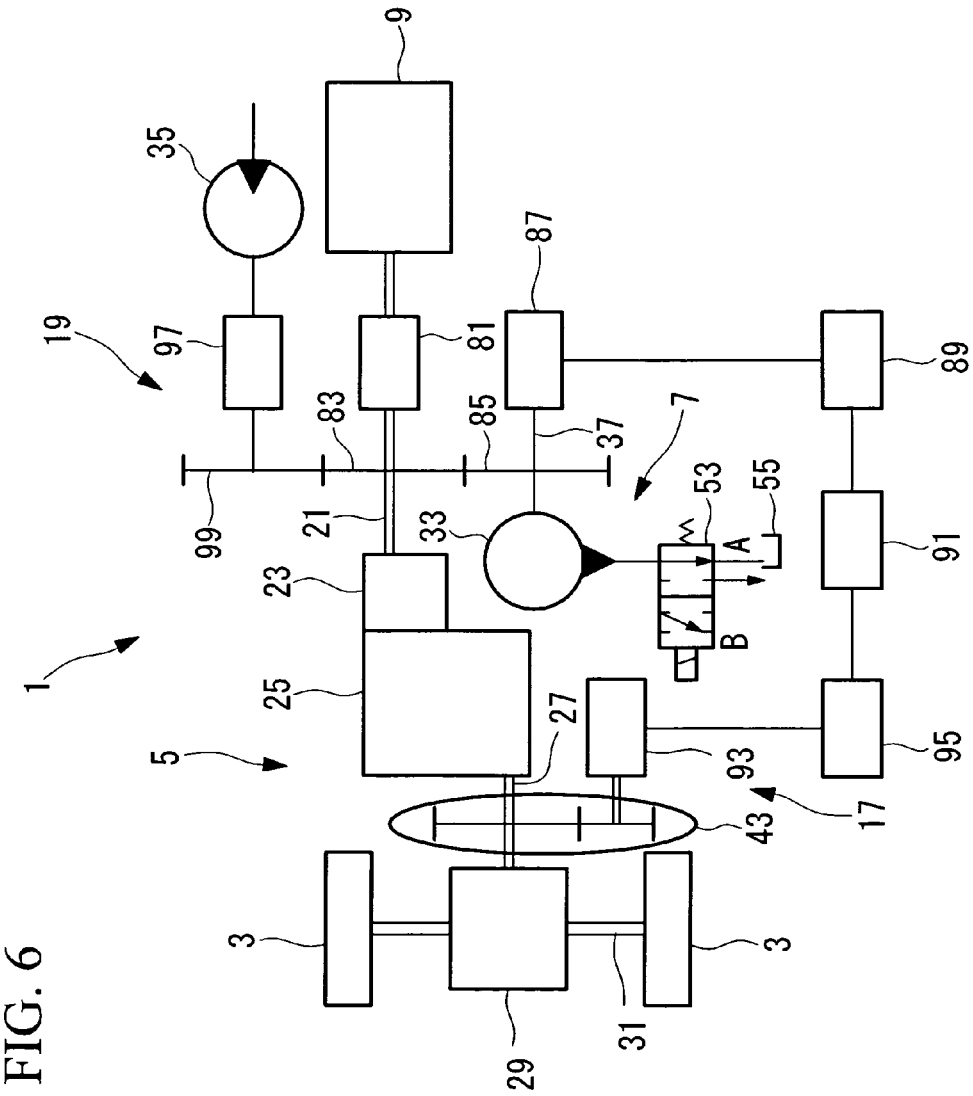
FIG. 6 is a block diagram showing a drive portion of a forklift according to a fifth embodiment of the invention.
Figure 7:
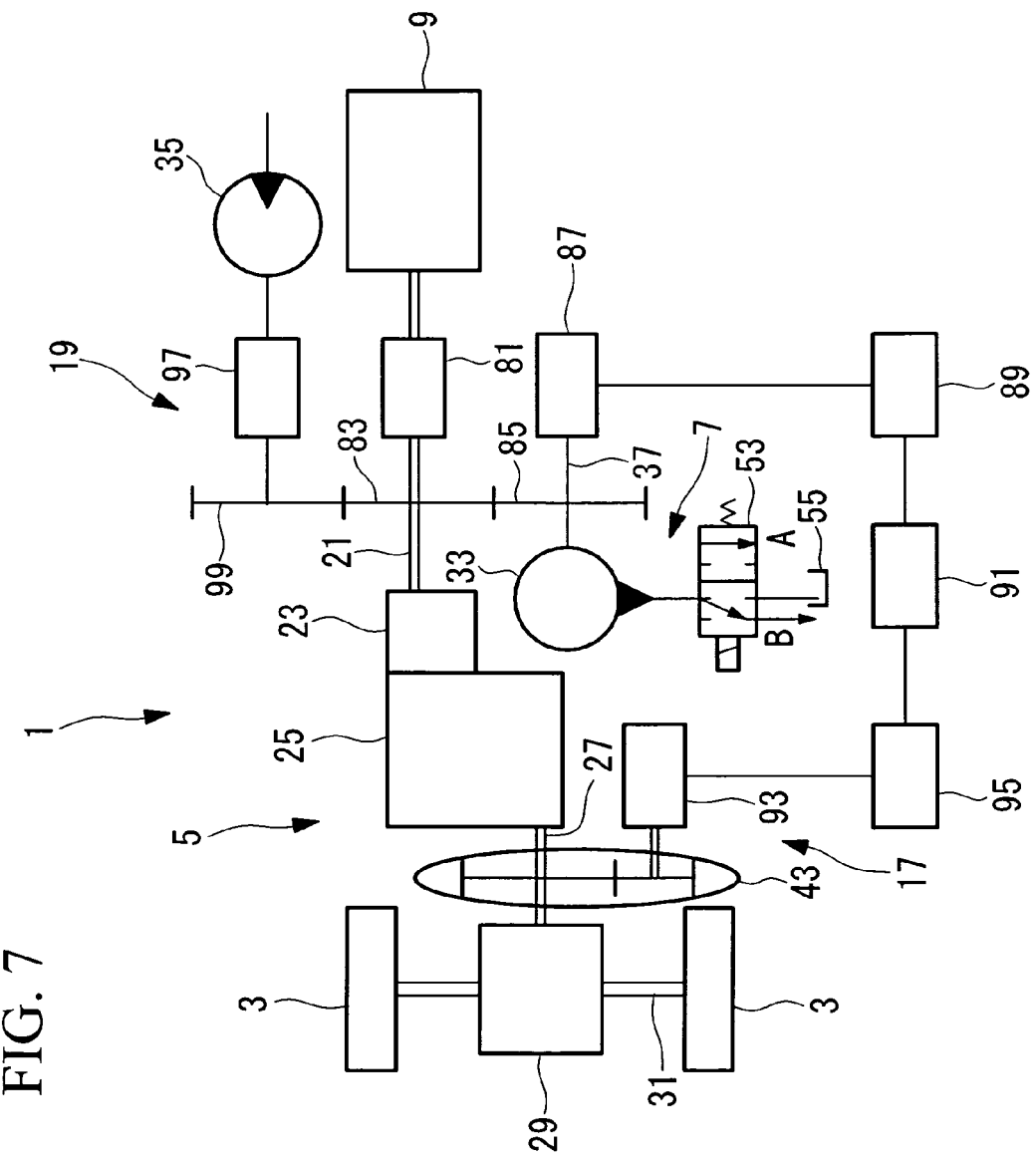
FIG. 7 is another block diagram showing the drive portion of the forklift according to the fifth embodiment of the invention.

FIG. 6 and FIG. 7 are block diagrams showing a drive portion of the forklift 1.

In this embodiment, the engine output shaft 21 and the work drive shaft 37 are spaced apart and made almost parallel to each other.

The engine output shaft 21 is provided with an engine output shaft one-way clutch (first one-way clutch) 81 on the engine 9 side. An engine output shaft gear 83 is fixed to the engine output shaft 21 between the engine output shaft one-way clutch 81 and the torque converter 23.

The fork drive portion 7 includes the hydraulic pump 33, the work drive shaft 37, and the switching valve 53.

A work drive shaft gear 85 meshed with the engine output shaft gear 83 is fixedly attached to the work drive shaft 37.

The work drive shaft 37 is engaged with a work assist motor/generator (first motor/generator) 87 on the opposite side with respect to the hydraulic pump 33.

The work assist motor/generator 87 is connected to a battery 91 via an inverter 89.

The driven side gear of the speed-up gear 43 is engaged with a traveling assist motor/generator (second motor/generator) 93. The traveling assist motor/generator 93 is gear-coupled to the traveling drive shaft 27 by the speed-up gear 43.

The traveling assist motor/generator 93 is connected to the battery 91 via an inverter 95.

The traveling assist motor/generator 93 is configured so as to drive the traveling drive shaft 27 via the speed-up gear 43 or to be rotated by the traveling drive shaft 27 via the speed-up gear and thus generate electric power.

A hydraulic motor output shaft gear 99 is fixedly attached to the rotation shaft of the hydraulic motor 35 via a hydraulic motor one-way clutch (second one-way clutch) 97.

The hydraulic motor output shaft gear 99 is meshed with the engine output shaft gear 83.

The hydraulic motor one-way clutch 97 and the hydraulic motor output shaft gear 99 form the work regeneration portion 19.

An operation of the forklift 1 of this embodiment described above will now be described.

For cargo handling work, the forklift 1 travels to a cargo while the fork is lowered and stops after it inserts the fork beneath the cargo.

Subsequently, it raises the fork (lift up) and lifts up the cargo.

It starts to travel in this state and transports the cargo to its destination.

It stops upon arrival at the destination. It then lowers the fork (lift down) and places the cargo down.

The forklift 1 is moved so as to pull out the fork from beneath the cargo and headed for a next work.

During cargo handling work by the forklift 1, the traveling wheels 3 repeat the cycle of start, acceleration, traveling at a constant speed, deceleration, and stop, and the fork repeats a cycle of stop, lift up, and lift down.

The cargo handling work by the forklift 1 is performed as these operations are combined.

Hereinafter, an example of these operations will be described.

Because the rotational frequency of the traveling wheels 3 is low at the beginning of the traveling, the traveling wheel drive portion 5 is driven by the traveling assist motor/generator 93 and the work assist motor/generator 87 whose energy efficiency remains the same when rotational frequency is low.

When the alternating-current electricity is supplied to the work assist motor/generator 87 from the battery 91 via the inverter 89, the work assist motor/generator 87 is driven rotationally. This rotational driving then rotationally drives the engine output shaft 21 by way of the work drive shaft 37, the work drive shaft gear 85, and the engine output shaft gear 83.

The rotational driving of the engine output shaft 21 is changed by the transmission 25 and transmitted to the traveling drive shaft 27.

In this instance, the hydraulic pump 33 is driven by the rotation of the work drive shaft 37. However, in the case where cargo handling work is not performed, if the switching valve 53 is switched to the port A, the operating oil is only returned to the operating oil tank 55 even when the hydraulic pump 33 is driven. Hence, there is no significant loss of power.

In addition, because the engine output shaft one-way clutch 81 is present between the work drive shaft 37 and the engine 9, even when the work assist motor/generator 87 (engine output shaft 21) rotates, this rotation will not rotationally drive the engine 9. For example, in a case where the driving is performed by the work assist motor/generator 87 without the engine 9, the engine output shaft one-way clutch 81 is capable of preventing the engine 9 from becoming a resisting force against the driving by the work assist motor/generator 87.

Further, the hydraulic motor output shaft gear 99 is driven by the engine output shaft gear 83. However, because the hydraulic motor one-way clutch 97 is present, the rotational driving force will not be transmitted to the hydraulic motor 35.

When the alternating-current electricity is supplied to the traveling assist motor/generator 93 from the battery 91 via the inverter 95, the traveling assist motor/generator 93 is driven rotationally. This rotational driving then rotationally drives the traveling drive shaft 27 via the speed-up gear 43.

In this way, because the engine 9 does not have to be driven in a case where the rotational frequency is low, the operational efficiency of the engine 9 will not be deteriorated.

At the time of accelerated traveling, the engine 9 is driven because the rotational frequency becomes higher and a large driving force is required.

In this case, the rotational frequency is increased quickly by driving the engine 9. When the rotational frequency of the engine 9 becomes higher than the rotational frequency of the engine output shaft 21 by the work assist motor/generator 87, the driving force of the engine 9 is added to the engine output shaft 21 through the engine output shaft one-way clutch 81.

In this way, because the rotation of the engine 9 is transmitted smoothly to the engine output shaft 21 by the engine output shaft one-way clutch 81, it is possible to prevent an abrupt change of the traveling speed, which makes it possible to maintain the ease of operation in a satisfactory manner.

Subsequently, in the case where cargo handling work is performed, the switching valve 53 is switched to the port B, as is shown in FIG. 7.

Because the hydraulic pump 33 is driven by the work drive shaft 37, the driving is performed by the work assist motor/generator 87 and the engine 9. The work assist motor/generator 87 is directly connected to the hydraulic pump 33 and the engine 9 is connected thereto via the engine rotation shaft 21, the engine output shaft gear 83, and the work drive shaft gear 85.

Because the engine output shaft 21 is being rotated, motive power is also transmitted to the vehicle drive portion 5, which enables the cargo handing work and the traveling at the same time.

When the hydraulic pump 33 is driven, the operating oil is supplied to the (not illustrated) actuator and for example, lift-up is performed.

In this way, for the traveling and the cargo handling work, the driving is performed by the engine 9, the traveling assist motor/generator 93, and/or the work assist motor/generator 87 according to the motive power required for the traveling and for the cargo handling work. It is therefore sufficient for the traveling assist motor/generator 93 and the work assist motor/generator 87 to have an output which corresponds to the output of the battery 91 and which together with the engine 9 generates the maximum required driving output.

Hence, the driving power of the traveling assist motor/generator 93 and of the work assist motor/generator 87 can be small in this embodiment in comparison with those that drive the traveling wheels 3 or the hydraulic pump 33 independently. The structure can be thus downsized.

Also, for example, the traveling assist motor/generator 93 and the work assist motor/generator 87 are used when driving output is low, whereas the driving is performed by the engine 9 when the driving force is increased and the driving is performed by the engine 9, the traveling assist motor/generator 93, and the work assist motor/generator 87 when still more driving force is required. Hence, not only can the engine 9 be run in a rotational frequency range where the fuel efficiency is high, but also the engine 9 itself can be downsized.

Subsequently, in the case of traveling deceleration by applying the brake, the energy is regenerated from the traveling wheel drive portion 5.

The forward-reverse clutch of the transmission 25 is shifted to the neutral position, so that the driving force from the traveling drive shaft 27 is not introduced to the transmission 25. When configured in this manner, because the torque converter 23 that causes a significant loss of motive power does not have to be driven, a larger amount of energy of the traveling wheel drive portion 5 can be regenerated.

The driving force of the traveling drive shaft 27 is transmitted to the traveling assist motor/generator 93 by way of the speed-up gear 43, rotationally driving the output shaft of the traveling assist motor/generator 93. When the output shaft is rotated, the traveling assist motor/generator 93 generates alternating-current electricity. The alternating-current electricity thus generated is converted to direct-current electricity by the inverter 95 and charged into the battery 91.

Subsequently, for example, in the case of the lift down, the hydraulic motor 35 is driven rotationally by the operating oil returning from the hydraulic actuator.

Rotation of the hydraulic motor 35 is transmitted to the work drive shaft 37 by way of the hydraulic motor output shaft gear 99, the engine output shaft gear 83, and the work drive shaft gear 85, and rotationally drives the output shaft of the work assist motor/generator 87.

When the output shaft is rotated, the work assist motor/generator 87 generates alternating-current electricity. The alternating-current electricity thus generated is converted to the direct-current electricity by the inverter 89 and charged into the battery 91.

In this case, because the engine output shaft gear 83 is present in the transmission channel from the hydraulic motor 35, for example, when the rotational frequency of the hydraulic motor 35 is reduced below the rotational frequency of the engine 9, the engine 9 rotates the work assist motor/generator 87. Regeneration from the hydraulic motor 35 thus ends.

This event will not occur in a case where the traveling is performed by the driving force of the traveling assist motor/generator 93. Regeneration from the hydraulic motor 35 and the traveling are thus enabled at the same time.

Because it is possible to drive the work assist motor/generator 87 by the engine 9 by way of the engine output shaft gear 83, the work drive shaft gear 85, and the work drive shaft 37, for example, by driving the engine 9 while the forward-reverse clutch of the transmission 25 is shifted to the neutral position so as not to transmit the motive power to the vehicle drive portion 5 from the engine 9, it is possible to generate electric power by rotationally driving the work assist motor/generator 87 and thus charge the battery 91 via the inverter 89.

As has been described, because the regenerative energy of the traveling wheel drive portion 5 is collected into the traveling assist motor/generator 93 whereas the regenerative energy of the fork drive portion 7 is collected separately, into the work assist motor/generator 87, it is possible to prevent interference of the portions with each other in a reliable manner.

The traveling assist motor/generator 93 and the work assist motor/generator 87 are driven by the single battery 91 commonly. However, each may be provided with an exclusive-use battery.

Sixth Embodiment

A sixth embodiment of the invention will now be described using FIG. 8.

In this embodiment, the basic configuration is the same as in the fifth embodiment and configurations of the fork drive portion 7 and the work regeneration portion 19 are different. Accordingly, these differences in this embodiment will be described and the description of the other portions will not be repeated.

The same components as in the fifth embodiment are labeled with the same numbers, and a detailed description of such components is omitted here.

Figure 8:
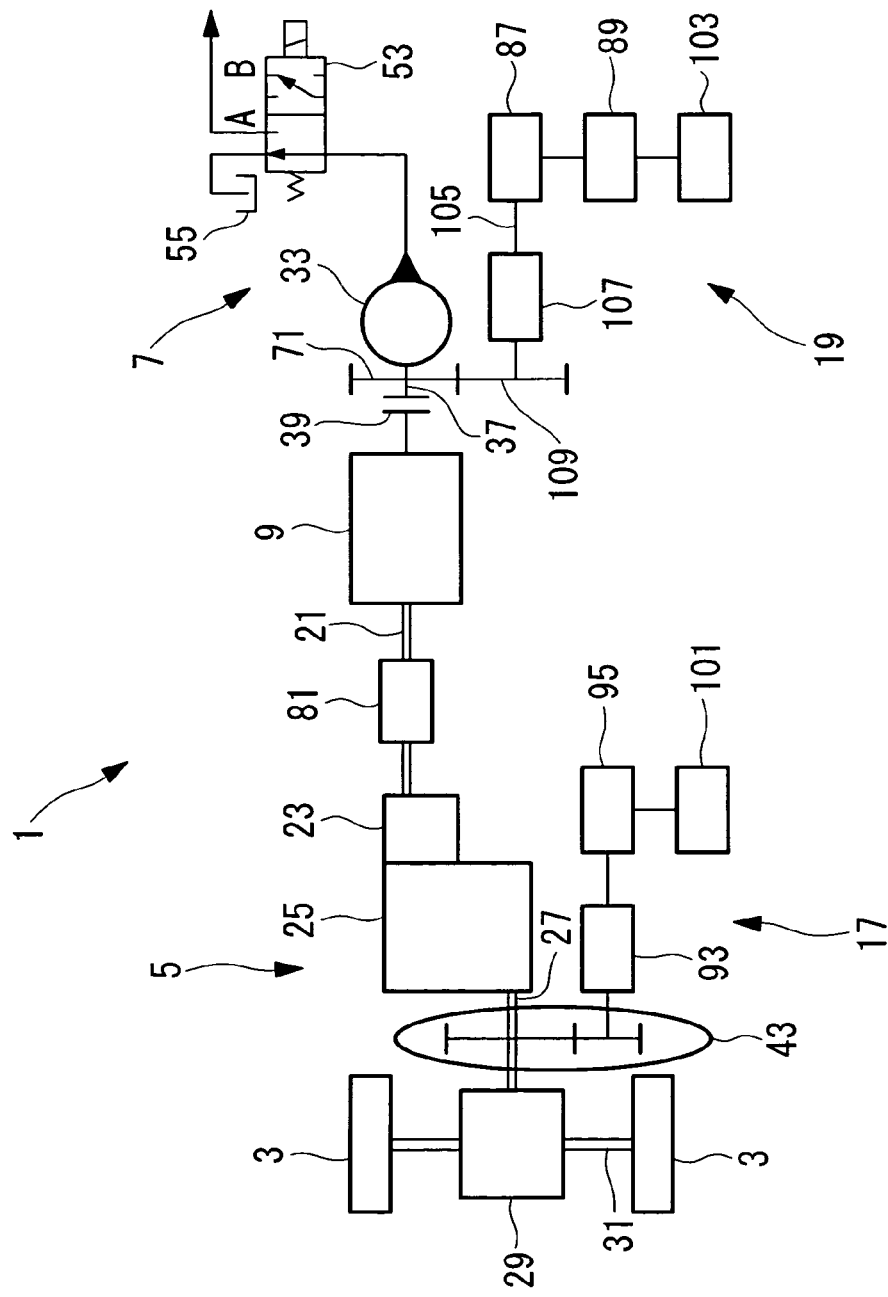
FIG. 8 is a block diagram showing a drive portion of a forklift according to a sixth embodiment of the invention.

FIG. 8 is a block diagram showing a drive portion of the forklift 1.

The traveling regeneration portion 17 includes a traveling battery 101 that drives the traveling assist motor/generator 93.

The engine output shaft 21 penetrates through the engine 9 so that it extends from both sides.

The fork drive portion 7 is of almost the same configuration as in the fourth embodiment.

The work drive shaft 37 is disposed so as to form the extended portion of the engine output shaft 21, and these two shafts are connected by the clutch 39 in a disconnectable manner.

The work drive shaft gear 71 is attached to the portion of the work drive shaft 37 toward the clutch 39.

The work assist motor/generator 87 is driven by a work battery 103.

The rotation shaft 105 of the work assist motor/generator 87 is configured so as to drive a rotation shaft gear 109 which is meshed with the work drive shaft gear 71, by way of a rotation shaft one-way clutch (second one-way clutch) 107.

An operation of the forklift 1 of this embodiment described above will now be described.

Because the rotational frequency of the traveling wheels 3 is low at the beginning of the traveling, the traveling wheel drive portion 5 is driven by the traveling assist motor/generator 93 whose energy efficiency remains the same when the rotational frequency is low.

When the alternating-current electricity is supplied to the traveling assist motor/generator 93 from the battery 101 via the inverter 95, the traveling assist motor/generator 93 is driven rotationally. This in turn rotationally drives the traveling drive shaft 27 via the speed-up gear 43.

In this instance, because the engine output shaft one-way clutch 81 is present, the traveling assist motor/generator 93 will not drive the engine 9.

In a case where the driving force is insufficient, the clutch 39 is engaged to connect the engine output shaft 21 and the work drive shaft 37 and introduce the driving force of the work assist motor/generator 87 to the engine output shaft 21. When the alternating-current electricity is supplied to the work assist motor/generator 87 from the battery 103 via the inverter 89, the work assist motor/generator 87 is rotated. This then rotationally drives the engine output shaft 21 by way of the output shaft gear 109, the work drive shaft gear 71, the work drive shaft 37, and the clutch 39.

The rotational driving of the engine output shaft 21 is changed by the transmission 25 and transmitted to the traveling drive shaft 27.

In this instance, the hydraulic pump 33 is driven by the rotation of the work drive shaft 37. However, in a case where cargo handling work is not performed, if the switching valve 53 is switched to the port A, the operating oil is only returned to the operating oil tank 55 even when the hydraulic pump 33 is driven. Hence, there is no significant loss of power.

As has been described, because the engine 9 does not have to be driven in a case where the rotational frequency is low, the operation efficiency of the engine 9 will not be deteriorated.

Subsequently, during traveling acceleration, the driving force of the engine output shaft 21 is increased by driving the engine 9 because the rotational frequency becomes higher and a large driving force is required.

In a case where cargo handling work is performed by the fork in this state, the switching valve 53 is switched to the port B.

Because the hydraulic pump 33 is driven by the work drive shaft 37, the driving is performed by the work assist motor/generator 87 and the engine 9.

Because the engine output shaft 21 is rotated, the motive power is also transmitted to the vehicle drive portion 5. The cargo handling work and the traveling are thus enabled at the same time.

When the hydraulic pump 33 is driven, the operating oil is supplied to the (not illustrated) hydraulic actuator by passing through the port B of the switching valve 53 and, for example, the lift up is performed.

In this way, for the traveling and the cargo handling work, the driving is performed by the engine 9, the traveling assist motor/generator 93, and/or the work assist motor/generator 87 according to the motive power required for the traveling and for the cargo handling. It is therefore sufficient for the traveling assist motor/generator 93 and the work assist motor/generator 87 to have an output which corresponds to the output of the battery 91 and which together with the engine 9 generates the maximum required driving output.

Hence, the driving force of the traveling assist motor/generator 93 and of the work assist motor/generator 87 in this embodiment can be small in comparison with those that drive the traveling wheels 3 or the hydraulic pump 33 independently. The structure can be thus downsized.

Also, for example, the traveling assist motor/generator 93 and the work assist motor/generator 87 are used when the driving force output is low, whereas the driving is performed by the engine 9 when the driving force is increased and the driving is performed by the engine 9, the traveling assist motor/generator 93, and the work assist motor/generator 87 when still more driving force is required. Hence, not only can the engine 9 be run in a rotational frequency range where the fuel efficiency is high, but also the engine 9 itself can be downsized.

Subsequently, in the case of travel deceleration by applying the brake, the energy is regenerated from the traveling wheel drive portion 5.

The forward-reverse clutch of the transmission 25 is shifted to the neutral position, so that the driving force from the traveling drive shaft 27 is not introduced to the transmission 25. When configured in this manner, because the torque converter 23 that causes a significant loss of motive power does not have to be used, a larger amount of energy of the traveling wheel drive portion 5 can be regenerated.

The driving force of the traveling drive shaft 27 is transmitted to the traveling assist motor/generator 93 by way of the speed-up gear 43 to rotationally drive the output shaft of the traveling assist motor/generator 93. When the output shaft is rotated, the traveling assist motor/generator 93 generates alternating-current electricity. The alternating-current electricity thus generated is converted to direct-current electricity by the inverter 95 and charged into the battery 101.

Subsequently, for example, in the case of lift-down, the hydraulic pump 33 is driven rotationally by the operating oil returning from the hydraulic actuator by way of the switching valve 53. The clutch 39 is disengaged.

Rotation of the hydraulic pump 33 is transmitted by way of the work drive shaft 37, the work drive shaft gear 71, and the output shaft gear 109, and rotationally drive the output shaft of the work assist motor/generator 87.

When the output shaft is rotated, the work assist motor/generator 87 generates alternating-current electricity. The alternating-current electricity thus generated is converted to the direct-current electricity by the inverter 89 and charged into the battery 103.

Because the clutch 39 is disengaged, driving the traveling wheel drive portion 5 with the engine 9 and the traveling assist motor/generator 93 causes the vehicle to travel.

Also, because the work assist motor/generator 87 can be driven by the engine 9 if the clutch 39 is engaged, it is possible to charge the battery 91 without any loss by switching the switching valve 53 to the port A.

In this way, the regenerative energy of the traveling wheel drive portion 5 is collected in the traveling assist motor/generator 93 and the regenerative energy of the fork drive portion 7 is separately collected, in the work assist motor/generator 87. It is thus possible to prevent the interference of the portions with each other in a reliable manner.

The embodiment may be configured in such a manner that the traveling assist motor/generator 93 and the work assist motor/generator 87 are driven by a single common battery.

Seventh Embodiment

A seventh embodiment of the invention will now be described using FIG. 9.

This embodiment is of a configuration similar to that of the fifth embodiment, and the configuration of the vehicle drive portion 5 and the configuration of the traveling regeneration portion 17 are different. Accordingly, these differences in this embodiment will be described and the description of the other portions will not be repeated.

The same components as in the fifth embodiment are labeled with the same numbers, and a detailed description of such components is omitted here.

Figure 9:
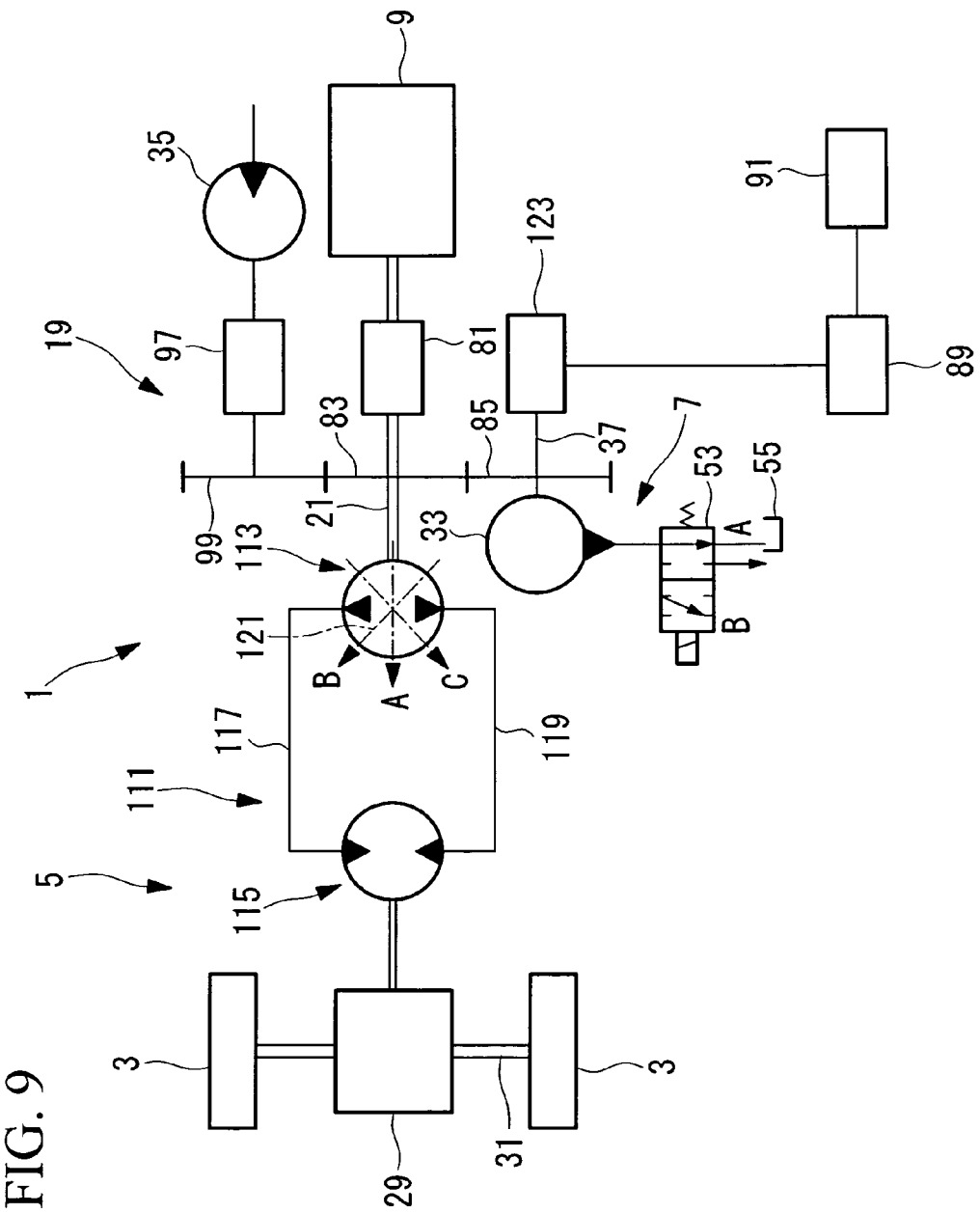
FIG. 9 is a block diagram showing a drive portion of a forklift according to a seventh embodiment of the invention.

FIG. 9 is a block diagram showing a drive portion of the forklift 1.

In this embodiment, a hydraulic transmission (fluid transmission) 111 is used in the vehicle drive portion 5.

The hydraulic transmission 111 includes a swash-plate type hydraulic pump 113 driven by the engine output shaft 21, a hydraulic motor 115 driven by the hydraulic pump 113, and hydraulic tubes 117 and 119 connecting the hydraulic pump 113 and the hydraulic motor 115.

The traveling drive shaft 27 is connected to the output portion of the hydraulic motor 115 so as to rotate together with rotation of the hydraulic motor 115.

The hydraulic pump 113 is provided with a swash plate 121 and it is configured in such a manner that the hydraulic pump 113 behaves differently according to the inclination of the swash plate 121.

More specifically, when the inclination of the swash plate 121 is at an inclination A, that is, at neutral, the hydraulic pump 113 does not perform the pumping. Hence, no oil flows into the hydraulic motor 115. Accordingly, because the hydraulic motor 115 is not rotated, the traveling drive shaft 27 is not driven.

When the inclination of the swash plate 121 is at an inclination B, the hydraulic pump 113 sends the oil toward the hydraulic tube 117 to generate a circulation flow for collecting the oil from the hydraulic tube 119.

In this case, the inclination angle of the inclination B is increased with respect to the inclination A. In other words, the flow rate of the oil increases as the inclination becomes larger, which increases the rotation speed of the hydraulic motor 115.

When the inclination of the swash plate 121 is at an inclination C, the hydraulic pump 113 sends the oil toward the hydraulic tube 119 to form a circulation flow for collecting the oil from the hydraulic tube 117. The traveling drive shaft 27 thus rotates in a direction opposite to the direction when the inclination is at B.

In this case, the inclination angle of the inclination C is increased with respect to the inclination A. In other words, the flow rate of the oil increases as the inclination becomes larger, which increases the rotation speed of the hydraulic motor 115.

In this way, even when the engine output shaft rotates in one direction, the hydraulic transmission 111 is capable of shifting the rotation of the traveling drive shaft to stop (neutral), forward rotation, and reverse rotation according to the inclinations of the swash plate 121.

Also, by adjusting the inclination angle of the swash plate 121, it is possible to adjust the rotational frequency and the rotation torque.

In this way, it is possible for the function of the torque converter 23 and the function of the transmission 25 described in the fifth embodiment to be achieved by the hydraulic transmission 111 formed of the hydraulic pump 113 and the hydraulic motor 115. The number of components can be thus reduced.

In addition, because transmission loss is less than where many transmission portions, such as the torque converter 23 and the transmission 25, are present, it is possible to enhance the driving force transmission efficiency.

When the hydraulic motor 115 is operated by the traveling drive shaft 27, the hydraulic motor 115 functions as the hydraulic pump and a circulation flow is formed. Accordingly, the hydraulic pump 113 functions as the hydraulic motor and is thereby rotated, which causes the engine output shaft 21 to rotate.

The engine output shaft 21 is rotated in this manner. However, because the engine output shaft one-way clutch 81 is present, this rotation will not be transmitted to the engine 9.

Meanwhile, because the engine output gear 83 is rotated, the assist motor/generator (auxiliary motor/generator) 123 is rotated via the work drive shaft gear 85.

Hence, in a case where the traveling drive shaft is rotated by the regenerative energy of the traveling wheel drive portion 5, the regenerative energy can be collected by the assist motor/generator 123 via the hydraulic transmission 111. The speed-up gear 43, the traveling assist motor/generator 93, and the inverter 95 for the traveling regeneration portion 17 provided in the fifth embodiment are therefore omitted in this embodiment.

As has been described, because the hydraulic transmission 111 is capable of transmitting the energy in the reverse direction, the configuration of the traveling regeneration portion can be made much more simple, which can in turn reduce the overall weight. The fuel efficiency can be therefore enhanced.

An operation of the forklift 1 of this embodiment described above will now be described.

For cargo handling work, the forklift 1 travels to a cargo while the fork is lowered and stops after it inserts the fork beneath the cargo.

Subsequently, it raises the fork (lift up) and lifts up the cargo.

It starts to travel in this state and transports the cargo to its destination.

It stops upon arrival at the destination. It then lowers the fork (lift down) and places the cargo down.

The forklift 1 is moved so as to pull out the fork from beneath the cargo and then heads for the next work.

During a cargo handling work by the forklift 1, the traveling wheels 3 repeat a cycle of start, acceleration, traveling at a constant speed, deceleration, and stop, and the fork repeats a cycle of stop, lift up, and lift down.

The cargo handling work performed by the forklift 1 is a combination of these operations.

Hereinafter, an example of these operations will be described.

Because the rotational frequency of the traveling wheels 3 is low at the beginning of the traveling, the traveling wheel drive portion 5 is driven by the assist motor/generator 123 whose energy efficiency remains the same when rotational frequency is low.

When the alternating-current electricity is supplied to the assist motor/generator 123 from the battery 91 via the inverter 89, the assist motor/generator 123 is driven rotationally. This rotational driving then rotationally drives the engine output shaft 21 by way of the work drive shaft 37, the work drive shaft gear 85, and the engine output shaft gear 83.

The rotational driving force of the engine output shaft 21 is changed or adjusted by the hydraulic transmission 111 and transmitted to the traveling drive shaft 27.

In this way, because the engine 9 does not have to be driven when the rotational frequency is low, the operation efficiency of the engine 9 will not be deteriorated.

In this instance, the hydraulic pump 33 is driven by rotation of the work drive shaft 37. However, in a case where a cargo handling work is not performed, if the switching valve 53 is switched to the port A, the operating oil is only returned to the operating oil tank 55 even when the hydraulic pump 33 is driven. Hence, there will be no significant loss of power.

In addition, because the engine output shaft one-way clutch 81 is present between the work drive shaft 37 and the engine 9, even when the assist motor/generator 123 (engine output shaft 21) rotates, the engine 9 will not be driven rotationally. For example, in a case where the driving is performed by the assist motor/generator 123 without the engine 9, the engine output shaft one-way clutch 81 is capable of preventing the engine 9 from resisting the driving of the assist motor/generator 123.

Further, the hydraulic motor output shaft gear 99 is driven by the engine output shaft gear 83. However, because the hydraulic motor one-way clutch 97 is present, the rotational driving force will not be transmitted to the hydraulic motor 35.

Subsequently, at the time of accelerated traveling, the engine 9 is driven because the rotational frequency becomes higher and a large driving force is required.

In this case, the rotational frequency is increased quickly by driving the engine 9. When the rotational frequency of the engine 9 becomes higher than the rotational frequency of the engine output shaft 21 driven by the assist motor/generator 123, the driving force of the engine 9 is added to the engine output shaft 21 through the engine output shaft one-way clutch 81.

As has been described, because the rotation of the engine 9 is transmitted smoothly to the engine output shaft 21 by the engine output shaft one-way clutch 81, it is possible to prevent an abrupt change of the traveling speed, which makes it possible to maintain the ease of operation in a satisfactory manner.

Subsequently, in a case where a cargo handling work is performed, the switching valve 53 is switched to the port B.

Because the hydraulic pump 33 is driven by the work drive shaft 37, the driving is performed by the assist motor/generator 123 and the engine 9. The assist motor/generator 123 is directly connected to the hydraulic pump 33 and the engine 9 is connected thereto via the engine rotation shaft 21, the engine output shaft gear 83, and the work drive shaft gear 85.

Because the engine output shaft 21 is rotated, motive power is also transmitted to the vehicle drive portion 5, which enables the cargo handing work and the traveling at the same time.

When the hydraulic pump 33 is driven, the operating oil is supplied to the (not illustrated) actuator and, for example, the lift up is performed.

As has been described, for the traveling and the cargo handling work, the driving is performed by the engine 9 and/or the assist motor/generator 123 according to the motive power required for the traveling and for the cargo handling work. It is therefore sufficient for the assist motor/generator 123 to have an output which corresponds to the output of the battery 91 and which together with the engine 9 generates the maximum required driving output.

Hence, the driving force of the assist motor/generator 123 of this embodiment can be small in comparison with one that drives the traveling wheels 3 or the hydraulic pump 33 independently. The structure can be thus downsized.

Also, for example, the assist motor/generator 123 is used when driving force output is low, whereas the driving is performed by the engine 9 when the driving force is increased and the driving is performed by the engine 9 and the assist motor/generator 123 when still more driving force is required. Hence, not only can the engine 9 be run in a rotational frequency range where the fuel efficiency is high, but also the engine 9 itself can be downsized.

Subsequently, in the case of travel deceleration by applying the brake, energy is regenerated from the traveling wheel drive portion 5.

The driving force of the traveling drive shaft 27 drives the hydraulic motor 115. When the hydraulic motor 115 rotates, oil flows into the hydraulic tube 117 or the hydraulic tube 119 to rotate the hydraulic pump 113. The engine output shaft 21 is therefore rotated.

When the engine output shaft 21 rotates, because the assist motor/generator 123 is rotated via the engine output gear 83 and the work drive shaft gear 85, the assist motor/generator 123 generates alternating-current electricity. The alternating-current electricity thus generated is converted to direct-current electricity by the inverter 89 and charged into the battery 91.

Subsequently, for example, in the case of lift-down, the hydraulic motor 35 is rotated by the operating oil returning from the hydraulic actuator.

Rotation of the hydraulic motor 35 is transmitted to the work drive shaft 37 by way of the hydraulic motor output shaft gear 99, the engine output shaft gear 83, and the work drive shaft gear 85, and work drive shaft 37 rotationally drives the output shaft of the assist motor/generator 123.

When the output shaft is rotated, the assist motor/generator 123 generates alternating-current electricity. The alternating-current electricity thus generated is converted to the direct-current electricity by the inverter 89 and charged into the battery 91.

Eighth Embodiment

An eighth embodiment of the invention will now be described using FIG. 10.

This embodiment is of a configuration similar to that of the seventh embodiment, and the configuration of the fork drive portion 7 is different. Accordingly, these differences in this embodiment will be described and the description of the other portions will not be repeated.

The same components as in the seventh embodiment are labeled with the same numbers, and a detailed description of such components is omitted here.

Figure 10:
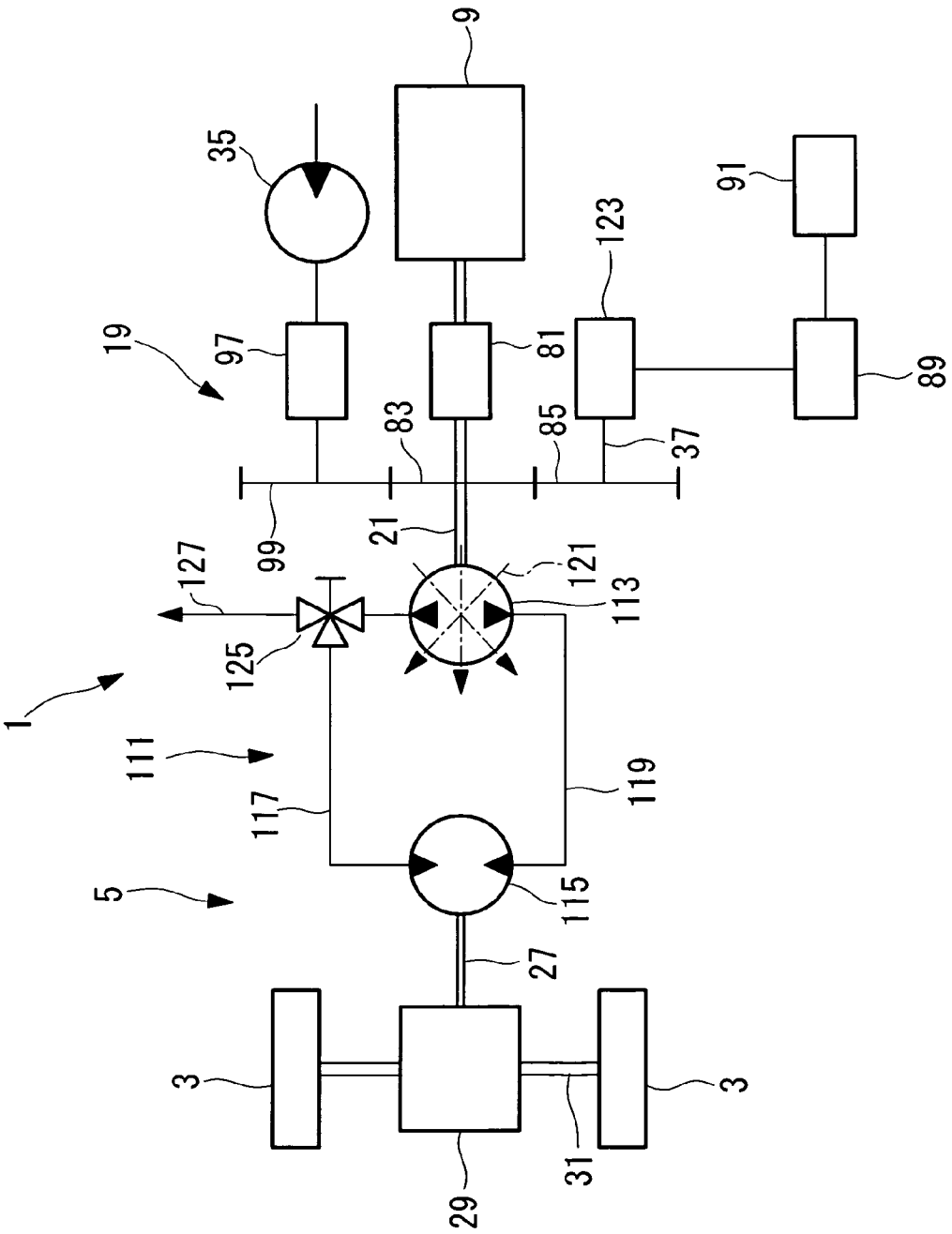
FIG. 10 is a block diagram showing a drive portion of a forklift according to an eighth embodiment of the invention.

FIG. 10 is a block diagram showing a drive portion of the forklift 1.

In this embodiment, the hydraulic tube 117 includes a drive-use three-way valve (switching valve for work) 125.

The drive-use three-way valve 125 communicates at one end with a hydraulic tube 127 that supplies the operating oil to the hydraulic actuator driving the fork, the actuator being for example a hydraulic cylinder. When switched, the drive-use three-way valve 125 selects whether the oil from the hydraulic pump 113 is introduced into the hydraulic motor 115 or into the hydraulic tube 127 that supplies the oil to the hydraulic actuator for driving the fork.

As has been described, because the flow of the oil in the hydraulic transmission 111 is used to move the fork, the hydraulic pump 33 and the switching valve 53 provided in the seventh embodiment are omitted herein.

Hence, because the fork drive portion 7 is simplified markedly, the overall weight can be further lessened. The fuel efficiency can therefore be further enhanced.

An example of an operation of the forklift 1 of this embodiment as described above will now be described.

Because the rotational frequency of the traveling wheels 3 is low at the beginning of the traveling, the traveling wheel drive portion 5 is driven by the assist motor/generator 123 whose energy efficiency remains the same when rotational frequency is low.

When the alternating-current electricity is supplied to the assist motor/generator 123 from the battery 91 via the inverter 89, the assist motor/generator 123 is rotated. This rotational driving then rotationally drives the engine output shaft 21 by way of the work drive shaft 37, the work drive shaft gear 85, and the engine output shaft gear 83.

The rotational driving of the engine output shaft 21 is changed or adjusted by the hydraulic transmission 111 and transmitted to the traveling drive shaft 27.

In this instance, the drive-use three-way valve 125 is connected to the port that brings the hydraulic pump 113 and the hydraulic motor 115 into communication.

In this way, because the engine 9 does not have to be driven in a case where the rotational frequency is low, the operation efficiency of the engine 9 will not be deteriorated.

In this instance, because the engine output shaft one-way clutch 81 is present between the work drive shaft 37 and the engine 9, even when the assist motor/generator 123 (engine output shaft 21) rotates, the engine 9 will not be rotated. For example, in a case where the driving is performed by the assist motor/generator 123 without the engine 9, the engine output shaft one-way clutch 81 is capable of preventing the engine 9 from resisting the driving of the assist motor/generator 123.

Further, the hydraulic motor output shaft gear 99 is driven by the engine output shaft gear 83. However, because the hydraulic motor one-way clutch 97 is present, the rotational driving force will not be transmitted to the hydraulic motor 35.

Subsequently, at the time of accelerated traveling, the engine 9 is driven because the rotational frequency becomes higher and a large driving force is required.

In this case, the rotational frequency is increased quickly by driving the engine 9. When the rotational frequency of the engine 9 becomes higher than the rotational frequency of the engine output shaft 21 driven by the assist motor/generator 123, the driving force of the engine 9 is added to the engine output shaft 21 through the engine output shaft one-way clutch 81.

As has been described, because the rotation of the engine 9 is transmitted smoothly to the engine output shaft 21 by the engine output shaft one-way clutch 81, it is possible to prevent an abrupt change of the traveling speed, which makes it possible to maintain the ease of operation in a satisfactory manner.

Subsequently, in a case where cargo handling work is performed, the drive-use three-way valve 125 is switched to introduce the oil into the hydraulic tube 127, and the swash plate 121 is moved to inclination B.

As the hydraulic pump 113 is rotated by rotation of the engine output shaft 21, the oil from the hydraulic pump 113 flows into the hydraulic tube 127 via the hydraulic tube 117 and the drive-use three-way valve 125. The fork is thus raised (lift-up)

In this instance, the engine output shaft 21 is driven by the assist motor/generator 123 and/or the engine 9.

In this way, for the traveling and the cargo handling work, the driving is performed by the engine 9 and/or the assist motor/generator 123 according to the motive power required for the traveling and for the cargo handling work. It is therefore sufficient for the assist motor/generator 123 to have an output which corresponds to the output of the battery 91 and which together with the engine 9 generates the maximum required driving output.

Hence, a driving force of the assist motor/generator 123 of this embodiment can be small in comparison with one that drives the traveling wheels 3 or the fork independently. The structure can be thus downsized.

Also, for example, the assist motor/generator 123 is used when driving force output is low, whereas the driving is performed by the engine 9 when the driving force is increased and the driving is performed by the engine 9 and the assist motor/generator 123 when still more driving force is required. Hence, not only can the engine 9 be fun in a rotational frequency range where the fuel efficiency is high, but also the engine 9 itself can be downsized.

Subsequently, in the case of travel deceleration by applying the brake, energy is regenerated from the traveling wheel drive portion 5.

The driving force of the traveling drive shaft 27 drives the hydraulic motor 115. When the hydraulic motor 115 rotates, the oil flows into the hydraulic tube 117 or the hydraulic tube 119 to rotate the hydraulic pump 113. The engine output shaft 21 is therefore rotated.

When the engine output shaft 21 rotates, the assist motor/generator 123 is rotated via the engine output gear 83 and the work drive shaft gear 85. The assist motor/generator 123 therefore generates alternating-current electricity. The alternating-current electricity thus generated is converted to direct-current electricity by the inverter 89 and charged into the battery 91.

Subsequently, for example, in the case of lift-down, the hydraulic motor 35 is driven rotationally by the operating oil returning from the hydraulic actuator.

Rotation of the hydraulic motor 35 is transmitted to the work drive shaft 37 by way of the hydraulic motor output shaft gear 99, the engine output shaft gear 83, and the work drive shaft gear 85 and the work drive shaft 37 rotationally drives the output shaft of the assist motor/generator 123.

When the output shaft is rotated, the assist motor/generator 123 generates alternating-current electricity. The alternating-current electricity thus generated is converted to the direct-current electricity by the inverter 89 and charged into the battery 91.

Ninth Embodiment

A ninth embodiment of the invention will now be described using FIG. 11.

This embodiment is of a configuration similar to that of the eighth embodiment and the configuration of the work regeneration portion 19 is different. Accordingly, these differences in this embodiment will be described and the description of the other portions will not be repeated.

The same components as in the eighth embodiment are labeled with the same numbers, and a detailed description of such components is omitted here.

Figure 11:
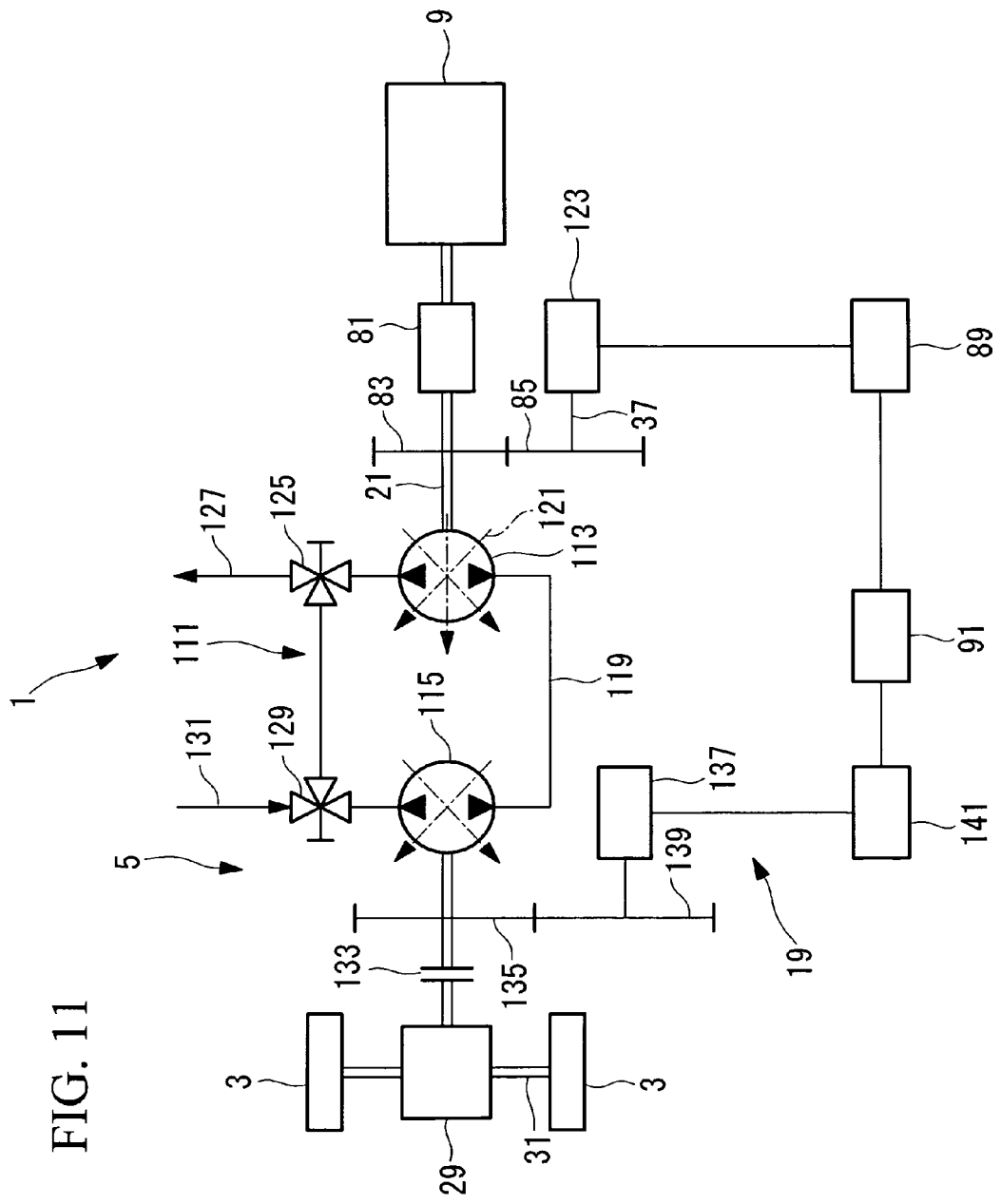
FIG. 11 is a block diagram showing a drive portion of a forklift according to a ninth embodiment of the invention.

FIG. 11 is a block diagram showing a drive portion of the forklift 1.

The work regeneration portion 19 in this embodiment will be described.

The hydraulic tube 117 includes a regeneration-use three-way valve 129 on the hydraulic motor 115 side of the drive-use three-way valve 125.

The regeneration-use three-way valve 129 communicates at one end with a hydraulic tube 131 for the operating oil returning from the hydraulic actuator driving the fork, the actuator being for example a hydraulic cylinder. When the regeneration-use three-way valve 129 is switched, it selects whether the hydraulic pump 113 communicates with the hydraulic motor 115, or with the hydraulic tube 131 by which oil returns from the actuator that drives the fork.

The traveling drive shaft 27 is provided with a clutch 133 that disconnects and connects, and a traveling drive shaft gear 135 attached between the clutch 133 and the hydraulic motor 115.

A motor/generator 137 for regeneration is provided in such a manner that a regeneration gear 139 attached to the output shaft of motor/generator 137 is meshed with the traveling drive shaft gear 135. The motor/generator 137 for regeneration is connected to the battery 91 via an inverter 141.

Also, the hydraulic motor 115 of this embodiment includes a swash plate 143 that switches between forward and reverse rotation.

As has been described, because the flow of the oil in the hydraulic transmission 111 is used for the work regeneration, the hydraulic motor 35, the hydraulic motor one-way clutch 97, and the hydraulic motor output shaft gear 99 provided in the eighth embodiment are omitted herein.

An example of an operation of the forklift 1 of this embodiment described above will now be described.

Because the rotational frequency of the traveling wheels 3 is low at the beginning of the traveling, the traveling wheel drive portion 5 is driven by the assist motor/generator 123 whose energy efficiency remains the same when rotational frequency is low.

When the alternating-current electricity is supplied to the assist motor/generator 123 from the battery 91 via the inverter 89, the assist motor/generator 123 is rotated. This rotational driving then rotationally drives the engine output shaft 21 by way of the work drive shaft 37, the work drive shaft gear 85, and the engine output shaft gear 83.

The rotational driving of the engine output shaft 21 is changed or adjusted by the hydraulic transmission 111 and transmitted to the traveling drive shaft 27 to which the clutch 133 is connected.

In this instance, the drive-use three-way valve 125 and the regeneration-use three-way valve 129 are switched to the respective ports that bring the hydraulic pump 113 and the hydraulic motor 115 into communication.

As has been described, because the engine 9 does not have to be driven in a case where the rotational frequency is low, the operation efficiency of the engine 9 will not be deteriorated.

In this instance, because the engine output shaft one-way clutch 81 is present between the hydraulic pump 113 and the engine 9, even when the assist motor/generator 123 (engine output shaft 21) rotates, the engine 9 will not be driven rotationally. For example, in a case where the driving is performed by the assist motor/generator 123 without the engine 9, the engine output shaft one-way clutch 81 is capable of preventing the engine 9 from resisting the driving of the assist motor/generator 123.

Subsequently, at the time of accelerated traveling, the engine 9 is driven because the rotational frequency becomes higher and a large driving force is required.

In this case, the rotational frequency is increased quickly by driving the engine 9. When the rotational frequency of the engine 9 becomes higher than the rotational frequency of the engine output shaft 21 driven by the assist motor/generator 123, the driving force of the engine 9 is added to the engine output shaft 21 through the engine output shaft one-way clutch 81.

As has been described, because the rotation of the engine 9 is transmitted smoothly to the engine output shaft 21 by the engine output shaft one-way clutch 81, it is possible to prevent an abrupt change of the traveling speed, which makes it possible to maintain the ease of operation in a satisfactory manner.

In a case where still more driving force is required, the traveling drive shaft 27 may be driven rotationally via the regeneration gear 139 and the traveling drive shaft gear 135 by rotationally driving the motor/generator 137 for regeneration.

Subsequently, in a case where cargo handling work is performed, the drive-use three-way valve 125 is switched to introduce the oil into the hydraulic tube 127, and the swash plate 121 is moved to the inclination B.

When the hydraulic pump 113 is rotated by the rotation of the engine output shaft 21, the oil from the hydraulic pump 113 flows into the hydraulic tube 127 via the hydraulic tube 117 and the drive-use three-way valve 125. The fork is thus raised (lift-up).

In this instance, the engine output shaft 21 is driven by the assist motor/generator 123 and/or the engine 9.

As has been described, for the traveling and the cargo handling work, the driving is performed by the engine 9, the assist motor/generator 123, and/or the motor/generator 137 for regeneration according to the motive power required for traveling and for the cargo handling work. It is therefore sufficient for the assist motor/generator 123 and the motor/generator 137 for regeneration to have an output which corresponds to the output of the battery 91 and which together with the engine 9 generates the maximum required driving output.

Hence, driving forces of the assist motor/generator 123 and the motor/generator 137 for regeneration in this embodiment can be small in comparison with those that drive the traveling wheels 3 or the fork independently. The structure can be thus downsized.

Also, for example, the assist motor/generator 123 is used when driving force output is low, whereas the driving is performed by the engine 9 when the driving force is increased, and the driving is performed by the engine 9 and the assist motor/generator 123 when still more driving force is required. Hence, not only can the engine 9 be run in a rotational frequency range where the fuel efficiency is high, but also the engine 9 itself can be downsized.

Subsequently, in the case of travel deceleration by applying the brake, energy is regenerated from the traveling wheel drive portion 5.

The driving force of the traveling drive shaft 27 rotates the motor/generator 137 for regeneration by way of the traveling drive shaft gear 135 and the regeneration gear 139. The motor/generator 137 for regeneration therefore generates alternating-current electricity.

The alternating-current electricity thus generated is converted to the direct-current electricity by the inverter 141 and charged into the battery 91.

Alternatively, regenerated energy may be collected by rotationally driving the assist motor/generator 123 by way of the hydraulic transmission 111 in the same manner as in the eighth embodiment.

Subsequently, for example, regeneration of the work energy in the case of, for example, the lift down will now be described.

The swash plate 121 of the hydraulic pump 113 is positioned at neutral (inclination A), so that no pumping will be performed. The clutch 133 is disengaged to disconnect the hydraulic motor 115 and the traveling wheel drive portion 5. The swash plate 143 of the hydraulic motor 115 is inclined for reverse travel.

The regeneration-use three-way valve 129 is switched so as to communicate with the hydraulic circuit 131.

During lift-down, the oil flows into the hydraulic motor 115 from the hydraulic tube 131 via the regeneration-use three-way valve 129. The hydraulic motor 115 is driven rotationally by the flow of the oil, which causes the traveling drive shaft 27 connected to the hydraulic motor 115 side to rotate.

When the traveling drive shaft 27 rotates, the motor/generator 137 for regeneration is rotated via the traveling drive shaft gear 135 and the regeneration gear 139. The motor/generator 137 for regeneration therefore generates alternating-current electricity.

The alternating-current electricity thus generated is converted to direct-current electricity by the inverter 141 and charged into the battery 91.

Tenth Embodiment

A tenth embodiment of the invention will now be described using FIG. 12.

This embodiment is of a configuration similar to that of the seventh embodiment and the position where the hydraulic transmission 111 is provided is different. Accordingly, this difference in this embodiment will be described and the description of the other portions will not be repeated.

The same components as in the seventh embodiment are labeled with the same numbers, and a detailed description of such components is omitted here.

Figure 12:
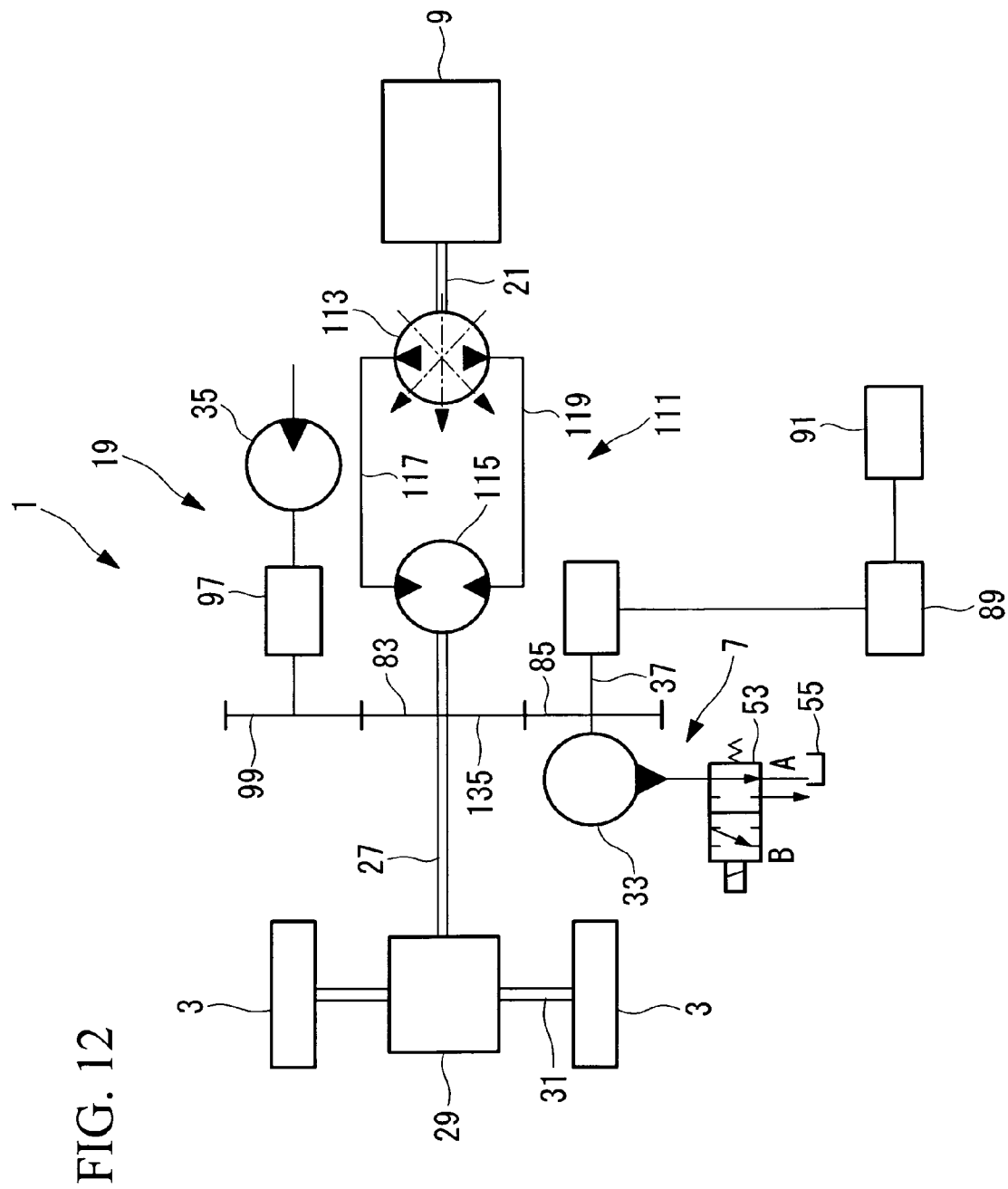
FIG. 12 is a block diagram showing a drive portion of a forklift according to a tenth embodiment of the invention.

FIG. 12 is a block diagram showing a drive portion of the forklift 1.

In this embodiment, the hydraulic pump 113 of the hydraulic transmission 111 is connected to the engine output shaft 21, and no component is interposed between the hydraulic pump 113 and the engine 9.

In the traveling drive shaft 27 is provided the traveling drive shaft gear 135.

The work regeneration portion 19, the fork drive portion 7, and the assist motor/generator 123 that are engaged with the engine output shaft gear 83 in the seventh embodiment are engaged with the traveling drive shaft gear 135 in this embodiment.

Accordingly, because transmission of the motive power is blocked by positioning the swash plate 121 or the like to neutral in the hydraulic transmission 111, the hydraulic transmission 111 carries out the function of the engine output shaft one-way clutch 81 used in the seventh embodiment.

Hence, the hydraulic transmission 111 is used as an alternative component carrying out the function of the engine output shaft one-way clutch 81 which has high sensitivity to vibration. This eliminates the need to use a one-way clutch having high sensitivity to vibration. The safety of the entire device can be thus enhanced.

An example of an operation of the forklift 1 of this embodiment described above will now be described.

Because the rotational frequency of the traveling wheels 3 is low at the beginning of the traveling, the traveling wheel drive portion 5 is driven by the assist motor/generator 123 whose energy efficiency remains the same when rotational frequency is low.

When the alternating-current electricity is supplied to the assist motor/generator 123 from the battery 91 via the inverter 89, the assist motor/generator 123 is driven rotationally. This rotational driving then rotationally drives the traveling drive shaft 27 by way of the work drive shaft 37, the work drive shaft gear 85, and the traveling drive shaft gear 135.

In this way, because the engine 9 does not have to be driven in a case where the rotational frequency is low, the operation efficiency of the engine 9 will not be deteriorated.

In this instance, because the hydraulic transmission 111 is present between the traveling drive shaft 27 and the engine 9, by positioning the swash plate 121 or the like to neutral, the engine 9 will not be driven rotationally even when the assist motor/generator 123 (traveling drive shaft 27) rotates.

In addition, the hydraulic motor output shaft gear 99 is driven by the traveling drive shaft gear 135. However, because the hydraulic motor one-way clutch 97 is present, the rotational driving force will not transmitted to the hydraulic motor 35.

Subsequently, at the time of accelerated traveling, the engine 9 is driven because the rotational frequency becomes higher and a large driving force is required.

In this case, the rotational frequency is increased quickly by driving the engine 9. When the rotational frequency of the engine 9 becomes sufficiently high, the driving force of the engine 9 is added to the traveling drive shaft 27 by adjusting the inclination of the swash plate 121 of the hydraulic transmission 111 or the like.

Subsequently, in a case where cargo handling work is performed, the switching valve 53 is switched to the port B.

Because the hydraulic pump 33 is driven by the work drive shaft 37, the driving is performed by the assist motor/generator 123 and the engine 9. The assist motor/generator 123 is directly connected to the hydraulic pump 33 and the engine 9 is connected thereto via the engine rotation shaft 21, the hydraulic transmission 111, the traveling drive shaft 27, the traveling drive shaft gear 135, and the work drive shaft gear 85.

Because the engine output shaft 21 is being rotated, motive power is also transmitted to the vehicle drive portion 5, which enables the cargo handing work and the traveling at the same time.

When the hydraulic pump 33 is driven, the operating oil is supplied to the (not illustrated) actuator and, for example, lift-up is performed.

The traveling drive shaft 27 is driven by the assist motor/generator 123 and the engine 9.

In this way, for the traveling and the cargo handling work, the driving is performed by the engine 9 and/or the assist motor/generator 123 according to the motive power required for the traveling and for the cargo handling work. It is therefore sufficient for the assist motor/generator 123 to have an output which corresponds to the output of the battery 91 and which together with the engine 9 generates the maximum required driving output.

Hence, the driving force of the assist motor/generator 123 of this embodiment can be small in comparison with one that drives the traveling wheels 3 or the fork independently. The structure can be thus downsized.

Also, for example, the assist motor/generator 123 is used when driving force output is low, whereas the driving is performed by the engine 9 when the driving force is increased and the driving is performed by the engine 9 and the assist motor/generator 123 when still more driving force is required. Hence, not only can the engine 9 be run in a rotational frequency range where the fuel efficiency is high, but also the engine 9 itself can be downsized.

Subsequently, in the case of travel deceleration by applying the brake, energy is regenerated from the traveling wheel drive portion 5.

Because the driving force of the traveling drive shaft 27 rotationally drives the assist motor/generator 123 via the traveling drive shaft gear 135 and the work drive shaft gear 85, the assist motor/generator 123 generates alternating-current electricity. The alternating-current electricity thus generated is converted to direct-current electricity by the inverter 89 and charged into the battery 91.

Subsequently, for example, in the case of the lift down, the hydraulic motor 35 is driven rotationally by the operating oil returning from the hydraulic actuator.

Rotation of the hydraulic motor 35 is transmitted to the work drive shaft 37 by way of the hydraulic motor output shaft gear 99, the traveling drive shaft gear 135, and the work drive shaft gear 85, and the work drive shaft 37 rotationally drives the output shaft of the work assist motor/generator 123.

When the output shaft is rotated, the assist motor/generator 123 generates alternating-current electricity. The alternating-current electricity thus generated is converted to the direct-current electricity by the inverter 89 and charged into the battery 91.

The invention claimed is:

1. A work vehicle having a traveling portion that performs traveling and a work portion that performs work using fluid pressure, comprising:
    an engine connected to an engine output shaft via a first one-way clutch;
    a traveling drive portion having a transmission connected to the engine output shaft and a traveling drive shaft which is rotated by the transmission and which moves the traveling portion;
    a work drive portion having a work drive shaft which is gear-coupled to an engine output shaft gear fixed to the engine output shaft and the work portion driven by the work drive shaft;
    a switching valve provided in the work drive portion which selects whether to supply fluid to the work portion or to a tank;
    a first motor/generator connected to the work drive shaft and driven by a battery;
    a work regeneration portion transmitting regenerative energy of the work drive portion to the engine output shaft gear via a second one-way clutch; and
    a second motor/generator which is gear-coupled to the traveling drive shaft and driven by the battery,
    wherein the switching valve selects to supply fluid to the tank when the first motor/generator drives the engine output shaft via the work drive shaft, and when the work is not to be performed by the work portion, and
    wherein the first one-way clutch transmits an output of the engine to the engine output shaft when a rotational frequency of the engine becomes higher than a rotational frequency of the engine output shaft.

2. The work vehicle according to claim 1, wherein:
    batteries are provided separately to the first motor/generator and the second motor/generator.

3. A work vehicle having a traveling portion that performs traveling and a work portion that performs work using fluid pressure, comprising:
    an engine connected to an engine output shaft via a one-way clutch;
    a traveling drive portion having a transmission connected to the engine output shaft and a traveling drive shaft which is rotated by the transmission and which moves the traveling portion;
    a work drive portion having a work drive shaft which is gear-couple to an engine output shaft gear fixed to the engine output shaft and the work portion driven by the work drive shaft;
    a switching valve provided in the work drive portion which selects whether to supply fluid to the work portion or to a tank;
    a first motor/generator connected to the work drive shaft and driven by a battery;
    a second motor/generator which is gear-coupled to the traveling drive shaft and driven by the battery; and
    a traveling regeneration portion transmitting regenerative energy from the traveling drive shaft to the second motor/generator during deceleration in the traveling portion,
    wherein in the second motor/generator generates electricity and charges the generated electricity into the battery during deceleration in the traveling portion,
    wherein the switching valve selects to supply fluid to the tank when the first motor/generator drives the engine output shaft via the work drive shaft, and when the work is not to be performed by the work portion, and
    wherein the one-way clutch transmits an output of the engine output shaft when a rotational frequency of the engine becomes higher than a rotational frequency of the engine output shaft.

* * * * *